United States Patent
Kanamori et al.

(10) Patent No.: US 10,351,657 B2
(45) Date of Patent: Jul. 16, 2019

(54) POLYESTER POLYOL, POLYURETHANE RESIN, AND PRODUCTION PROCESSES THEREFOR

(71) Applicant: MITSUBISHI CHEMICAL CORPORATION, Tokyo (JP)

(72) Inventors: Yoshikazu Kanamori, Tokyo (JP); Shigeki Nitta, Tokyo (JP); Kaori Yano, Tokyo (JP); Takayuki Aoshima, Tokyo (JP); Yuta Hioki, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/784,973

(22) Filed: Oct. 16, 2017

(65) Prior Publication Data

US 2018/0037692 A1 Feb. 8, 2018

Related U.S. Application Data

(63) Continuation of application No. PCT/JP2016/088403, filed on Dec. 22, 2016.

(30) Foreign Application Priority Data

Dec. 24, 2015 (JP) ................... 2015-252151

(51) Int. Cl.
| | | |
|---|---|---|
| *C08J 5/18* | (2006.01) | |
| *C08K 5/07* | (2006.01) | |
| *A43B 13/04* | (2006.01) | |
| *C08G 18/08* | (2006.01) | |
| *C08G 18/24* | (2006.01) | |
| *C08G 18/32* | (2006.01) | |
| *C08G 18/42* | (2006.01) | |
| *C08G 18/66* | (2006.01) | |
| *C08G 18/76* | (2006.01) | |
| *C08G 63/16* | (2006.01) | |
| *C08G 63/78* | (2006.01) | |
| *C08G 101/00* | (2006.01) | |

(52) U.S. Cl.
CPC .......... *C08G 18/4238* (2013.01); *A43B 13/04* (2013.01); *C08G 18/14* (2013.01); *C08G 18/246* (2013.01); *C08G 18/3206* (2013.01); *C08G 18/664* (2013.01); *C08G 18/7671* (2013.01); *C08G 63/16* (2013.01); *C08G 63/78* (2013.01); *C08J 5/18* (2013.01); *C08K 5/07* (2013.01); *C08G 2101/00* (2013.01); *C08G 2410/00* (2013.01); *C08J 2375/06* (2013.01)

(58) Field of Classification Search
CPC ............ C08G 18/4238; C08G 18/7671; C08G 18/3206; C08G 18/664; C08G 18/14; C08G 63/78; C08G 63/16; C08G 2410/00; C08G 18/246; C08G 2101/00; C08K 5/07; C08J 5/18; C08J 2375/06; A43B 13/04
See application file for complete search history.

(56) References Cited

U.S. PATENT DOCUMENTS

| | | | | | |
|---|---|---|---|---|---|
| 5,439,952 | A | * | 8/1995 | Lum | ................... C09D 133/068 523/410 |
| 5,606,005 | A | * | 2/1997 | Oshita | ................ C08G 18/4238 528/83 |
| 2011/0124905 | A1 | | 5/2011 | Pinkos et al. | |
| 2013/0035448 | A1 | | 2/2013 | Ohara et al. | |
| 2013/0338395 | A1 | | 12/2013 | Ohara et al. | |
| 2014/0141369 | A1 | | 5/2014 | Hosokawa et al. | |
| 2015/0291724 | A1 | | 10/2015 | Kusano et al. | |

FOREIGN PATENT DOCUMENTS

| | | |
|---|---|---|
| JP | 2004-189797 A | 7/2004 |
| JP | 2008-303285 A | 12/2008 |
| JP | 2012-097184 A | 5/2012 |
| JP | 2012-097189 A | 5/2012 |
| JP | 2013-047330 A | 3/2013 |
| JP | 2013-080052 A | 5/2013 |
| JP | 2013-227491 A | 11/2013 |
| JP | 2014-037552 A | 2/2014 |
| JP | 2014-141548 A | 8/2014 |
| JP | 2014-185320 A | 10/2014 |
| JP | 2015-042635 A | 3/2015 |
| WO | WO-2011/125720 A1 | 10/2011 |

OTHER PUBLICATIONS

International Search Report dated Feb. 21, 2017 for the corresponding PCT Application No. PCT/JP2016/088403.
International Preliminary Report of Patentability dated Feb. 12, 2018 for PCT International Patent Application No. PCT/JP2016/088403.

* cited by examiner

*Primary Examiner* — Rabon A Sergent
(74) *Attorney, Agent, or Firm* — Leason Ellis LLP

(57) ABSTRACT

The present invention aims to provide a polyester polyol having favorable reactivity and a favorable color tone, which can be used for obtaining a polyurethane having an excellent balance of flexibility, mechanical strength, and chemical resistance, and a method for producing the polyester polyol. The object can be achieved with a polyester polyol in which an aliphatic diol contains as a structural unit 1,10-decanediol derived from a biomass resource, and in which the aldehyde body content in the polyester polyol is 0.01 to 0.5% by weight, and a method for producing the polyester polyol.

18 Claims, No Drawings

POLYESTER POLYOL, POLYURETHANE RESIN, AND PRODUCTION PROCESSES THEREFOR

CROSS-REFERENCE TO RELATED APPLICATION

This is a continuation of International Application No. PCT/JP2016/088403, filed on Dec. 22, 2016, and designated the U.S., and claims priority from Japanese Patent Application No. 2015-252151 which was filed on Dec. 24, 2015, the entire contents of which are incorporated herein by reference.

TECHNICAL FIELD

The present invention relates to a method for producing a polyester polyol, which is used as a material for polyurethane resins and the like; a polyurethane resin using the polyester polyol; and methods for producing them.

BACKGROUND ART

Polyols represented by polyester polyol and polyether polyol produce polyurethane resins by reaction with isocyanate. Polyols constitute the soft segment portions in polyurethane resins, and largely contribute to physical properties of the polyurethane resins such as mechanical properties and durability. Since polyester polyol gives better physical properties to polyurethane resins in terms of mechanical strength and weatherability than other polyols, polyester polyol is widely used for polyurethane resins to be used as materials for synthetic/artificial leathers, plastic foams for shoe soles, thermoplastic resins, paints, adhesives, and the like.

Moreover, in recent years, global environmental issues have been attracting attention, and providing of materials that are conscious of the global environment is demanded. Also for polyurethane resins, use of materials derived from biomass resources such as plants instead of petroleum-derived materials is becoming popular.

In terms of biomass resources from which polyester polyols are derived, there are, for example, cases where biomass-derived succinic acid or castor-oil-derived sebacic acid is used as a material dicarboxylic acid, and cases where 1,3-propanediol obtained by a fermentation method or 1,10-decanediol derived from castor oil is used as a material diol. (Patent Documents 1, 2, 3, and 4)

On the other hand, unlike materials prepared from petroleum, most of the materials derived from biomass resources require a high-level purification process for increasing their purity since they contain a large amount of impurities. This often prevents their wide application as materials. The same applies to materials of polyester polyol. Materials which can be easily obtained without high-level purification and which give favorable physical properties to polyurethane resins are demanded.

PRIOR ART DOCUMENTS

Patent Documents

Patent Document 1: WO 2011/125720
Patent Document 2: JP 2014-37552 A
Patent Document 3: JP 2014-141548 A
Patent Document 4: JP 2012-97189 A

SUMMARY OF THE INVENTION

Problems to be Solved by the Invention

None of these conventional techniques, that is, none of the techniques exemplified by Patent Documents 1 to 4, in production of a polyester polyol on, paid attention to the influence of compounds that are made to coexist with the material aliphatic diol on the efficiency of production of the polyester polyol, or the effect of the compounds on the reactivity and physical properties in production of a polyurethane resin using the polyester polyol as a material. Moreover, production of a polyester polyol using a diol derived from a biomass resource as a material, and industrial production and use of its polyurethane, have not been useful from the viewpoint of the cost and the quality.

The present invention was made in view of the above problems that could not been solved by these conventional techniques. Thus, an object of the present invention is to provide a method for producing a polyester polyol containing an aliphatic diol derived from a biomass resource, wherein the produced polyester polyol shows favorable reactivity in polymerization and has a favorable color tone, and to provide a polyester polyol containing as a structural unit an aliphatic diol derived from a biomass resource, wherein the polyester polyol shows favorable reactivity upon urethane polymerization, and wherein the obtained polyurethane has an excellent color tone and an excellent balance of physical properties including flexibility, mechanical strength, chemical resistance, and hot-water resistance.

Means for Solving the Problems

The present inventors intensively studied to solve the problems described above, and, as a result, discovered that, by use of a polyester polyol which contains a particular aliphatic diol unit and in which the aldehyde body content in the polyester polyol is 0.01 to 0.5% by weight, a polyurethane having a favorable color tone and an excellent balance of flexibility, mechanical strength, chemical resistance, and hot-water resistance can be obtained, thereby reaching the present invention. The present inventors also discovered that, by producing a polyester polyol by polycondensing a dicarboxylic acid with a biomass-resource-derived aliphatic diol containing 0.01 to 1% by weight aldehyde body, polycondensation of the polyester polyol can be carried out with favorable reactivity, and a polyurethane having an excellent balance of flexibility, mechanical strength, chemical resistance, and hot-water resistance can be obtained from the polyester polyol, thereby reaching the present invention.

The present invention was achieved based on such discoveries, and can be summarized as follows.

[1] A polyester polyol comprising a structural unit derived from a dicarboxylic acid and a structural unit derived from an aliphatic diol, wherein
a structural unit derived from 1,10-decanediol is contained as the aliphatic diol unit;
the polyester polyol has a number average molecular weight of 250 to 5000; and
the polyester polyol contains 0.01 to 0.5% by weight aldehyde body.
[2] The polyester polyol according to [1], wherein the dicarboxylic acid contains a dicarboxylic acid derived from a biomass resource.
[3] The polyester polyol according to [2], wherein the dicarboxylic acid contains succinic acid derived from a biomass resource.

[4] A polyurethane resin obtained by reacting the polyester polyol according to any one of [1] to [3] with one or more kinds of polyisocyanate and a chain extender.
[5] A method for producing a polyurethane resin, comprising a step of reacting the polyester polyol according to any one of [1] to [3] with one or more kinds of polyisocyanate.
[6] The method for producing a polyester polyol according to any one of [1] to [3], comprising a step of polycondensing at least a dicarboxylic acid and an aliphatic diol, wherein
the aliphatic diol contains 1,10-decanediol; and
the aldehyde body content in the polyester polyol is 0.01 to 0.5% by weight.

Effect of the Invention

By the present invention, a polyester polyol having favorable reactivity and a favorable color tone can be obtained. A polyurethane produced using the polyester polyol is characterized in that a favorable reactivity can be obtained in the urethane polymerization, and that the balance among the flexibility, mechanical strength, chemical resistance, and hot-water resistance is excellent, so that the polyurethane is suitable for uses in elastic fibers, synthetic or artificial leathers, paints, and high-performance elastomers, and is therefore industrially very useful.

MODE FOR CARRYING OUT THE INVENTION

Modes of the present invention are described below in detail. However, the present invention is not limited to the following embodiments, and may be carried out with a variety of modifications within the scope of the invention.

Here, in the present description, the term "% by mass" has the same meaning as the term "% by weight"; the term "ppm by mass" has the same meaning as the term "ppm by weight"; and the term "part by mass" has the same meaning as the term "part by weight". When the simple term "ppm" is used, it means "ppm by weight".

[1. Polyester Polyol]

The polyester polyol as an embodiment of the present invention is a polyester polyol which contains a structural unit derived from a dicarboxylic acid and a structural unit derived from an aliphatic diol, and which is typically produced by polycondensation of a dicarboxylic acid with an aliphatic diol including 1,10-decanediol.

<Dicarboxylic Acid>

Examples of the dicarboxylic acid used in the present invention (which includes dicarboxylic acids as well as their derivatives such as their esters) include aliphatic dicarboxylic acids, aliphatic dicarboxylic acid derivatives, aromatic dicarboxylic acids, and aromatic dicarboxylic acid derivatives. These may be used individually, or two or more of these may be used as a mixture. In particular, for uses requiring weatherability such as synthetic/artificial leathers and paints, an aliphatic dicarboxylic acid(s) and/or a derivative(s) thereof may be preferably used as a major component(s) from the viewpoint of preventing yellowing caused by light. On the other hand, for uses requiring strength such as elastic fibers, an aromatic dicarboxylic acid(s) and/or a derivative(s) thereof may be preferably used as a major component(s) since they have high cohesive strength.

The term "as a major component" herein means that the content with respect to the total dicarboxylic acid is usually not less than 50 mol %. The content is more preferably not less than 60 mol %, still more preferably not less than 70 mol %, especially preferably not less than 90 mol %.

Examples of the aromatic dicarboxylic acids include terephthalic acid and isophthalic acid. Examples of the aromatic dicarboxylic acid derivatives include lower alkyl esters of the aromatic dicarboxylic acids. Specific examples of the lower alkyl esters of the aromatic dicarboxylic acids include the methyl ester, ethyl ester, propyl ester, and butyl ester.

The aromatic dicarboxylic acid is preferably terephthalic acid or isophthalic acid. The aromatic dicarboxylic acid derivative is preferably dimethyl terephthalate or dimethyl isophthalate. For example, by using an arbitrary aromatic dicarboxylic acid such as a dimethyl terephthalate and polyester of 1,4-butanediol, a desired aromatic polyester polyol polyurethane can be produced.

Usually, the aliphatic dicarboxylic acid is preferably a chain (including linear chain and branched chain) or alicyclic dicarboxylic acid having 2 to 40 carbon atoms. The number of carbon atoms in the chain or alicyclic dicarboxylic acid is preferably not less than 4. On the other hand, the number of carbon atoms is preferably not more than 30, more preferably not more than 20.

Specific examples of the chain or alicyclic dicarboxylic acid having 2 to 40 carbon atoms include oxalic acid, succinic acid, 2-methylsuccinic acid, glutaric acid, adipic acid, sebacic acid, dodecanedioic acid, dimer acid, and cyclohexanedicarboxylic acid. Among these, from the viewpoint of physical properties of the polyurethane obtained, the aliphatic dicarboxylic acid is preferably adipic acid, succinic acid, 2-methylsuccinic acid, sebacic acid, or a mixture of these. The aliphatic dicarboxylic acid is especially preferably one containing succinic acid as a major component.

Examples of the derivatives of the aliphatic dicarboxylic acids include lower (for example, $C_{1-6}$) alkyl esters such as the methyl ester, ethyl ester, propyl ester, and butyl ester of the aliphatic dicarboxylic acids, and cyclic acid anhydrides of the aliphatic dicarboxylic acids such as succinic anhydride. Among these, the derivative of the aliphatic dicarboxylic acid is preferably the methyl ester of adipic acid or succinic acid, or a mixture of these.

The dicarboxylic acid used in the present invention may contain a component derived from a biomass resource. Preferred examples of the component derived from a biomass resource contained in the dicarboxylic acid component include terephthalic acid, adipic acid, succinic acid, and sebacic acid. Among these, terephthalic acid and succinic acid are especially preferred.

The term "dicarboxylic acid contains a component derived from a biomass resource" in the present invention means that, in cases where the dicarboxylic acid component is of a single type, it may be a mixture of, for example, succinic acid derived from petroleum and, for example, succinic acid derived from a biomass resource(s), and that, in cases where the dicarboxylic acid is a mixture of two or more kinds of dicarboxylic acids, at least one kind of dicarboxylic acid component may be derived from a biomass resource, that is, the dicarboxylic acid may be a mixture containing a dicarboxylic acid component(s) derived from a biomass resource(s) and a dicarboxylic acid component(s) derived from petroleum. In cases where the dicarboxylic acid is a mixture of a dicarboxylic acid component(s) derived from a biomass resource(s) and a dicarboxylic acid component(s) derived from petroleum, the content of the dicarboxylic acid component(s) derived from a biomass resource(s) is preferably not less than 20 mol %, more preferably not less than 40 mol %, still more preferably not less than 60 mol %, especially preferably 90 to 100 mol %.

The biomass resource in the present invention includes: biomass resources storing the sunlight energy in the form of starch, sugar, cellulose, and/or the like as a result of conversion of the sunlight energy by the photosynthetic action of plants; the bodies of animals whose growth depends on eating of plant bodies; and products produced by processing of plant bodies or animal bodies.

Among these, plant resources are more preferred as the biomass resource. Examples of the plant resources include wood, rice straw, rice hull, rice bran, old rice, maize, sugar cane, cassava, sago palm, soy pulp, corn cob, tapioca meal, bagasse, vegetable oil meal, tubers, buckwheat, soy, fat, waste paper, paper residues, aquatic product residues, livestock excrement, sewage sludge, and food wastes.

Among these, plant resources such as wood, rice straw, rice hull, rice bran, old rice, maize, sugar cane, cassava, sago palm, soy pulp, corn cob, tapioca meal, bagasse, vegetable oil meal, tubers, buckwheat, soy, fat, waste paper, and paper residues are preferred. Wood, rice straw, rice hull, old rice, maize, sugar cane, cassava, sago palm, tubers, fat, waste paper, and paper residues are more preferred. Maize, sugar cane, cassava, and sago palm are most preferred. These biomass resources generally contain the nitrogen element, and various alkali metals and alkaline earth metals such as Na, K, Mg, and Ca.

The method of induction of these biomass resources into carbon sources is not limited. For example, the biomass resources may be subjected to a known pretreatment(s) such as chemical treatment using an acid or an alkali, biological treatment using a microorganism, and/or physical treatment, and then to a saccharification process, to be derived into carbon sources.

The above processes usually include, but do not necessarily need to include, a step of crushing the biomass resources into fine pieces by pretreatment such as chipping, shaving, or grinding. If necessary, a pulverization step using a grinder and/or a mill may also be included.

The biomass resources that have thus been made into fine pieces are derived into carbon sources by further being subjected to a step of pretreatment and saccharification. Specific examples of the method include chemical methods such as acid treatment with a strong acid, for example, sulfuric acid, nitric acid, hydrochloric acid, or phosphoric acid, alkali treatment, ammonia freeze steam blasting method, solvent extraction, super-critical fluid treatment, and oxidizing agent treatment; physical methods such as fine pulverization, steam blasting method, microwave treatment, and electron beam irradiation; and biological treatments such as hydrolysis by a microorganism or by enzyme treatment.

Examples of the carbon sources that are derived from the biomass resources include fermentable carbohydrates, for example, hexoses such as glucose, mannose, galactose, fructose, sorbose, and tagatose; pentoses such as arabinose, xylose, ribose, xylulose, and ribulose; disaccharides and polysaccharides such as pentosan, saccharose, starch, and cellulose; fatty acids such as butyric acid, caproic acid, caprylic acid, capric acid, lauric acid, myristic acid, palmitic acid, palmitoleic acid, stearic acid, oleic acid, linoleic acid, linolenic acid, monoctinic acid, arachidic acid, eicosenoic acid, arachidonic acid, behenic acid, erucic acid, docosapentaenoic acid, docosahexaenoic acid, lignoceric acid, and serakorenic acid; and polyalcohols such as glycerin, mannitol, xylitol, and ribitol. Among these, glucose, maltose, fructose, sucrose, lactose, trehalose, and cellulose are preferred.

Using these carbon sources, dicarboxylic acids can be synthesized by a fermentation method comprising microbial conversion using a microorganism having a capacity to produce a dicarboxylic acid; a chemical conversion method comprising a reaction process(es) such as hydrolysis, dehydration reaction, hydration reaction, and/or oxidation reaction; or combination of the fermentation method and the chemical conversion method. Among these, a fermentation method by microbial conversion is preferred.

The microorganism having a capacity to produce dicarboxylic acid is not limited as long as it is a microorganism having a capacity to produce dicarboxylic acid. Examples of the microorganism having a capacity to produce dicarboxylic acid include intestinal bacteria such as *Escherichia coli*, bacteria belonging to the genus *Bacillus*, and coryneform bacteria. Among these, aerobic microorganisms, facultative anaerobic microorganisms, and microaerophilic microorganisms are preferred.

Examples of the aerobic microorganisms include coryneform bacteria, bacteria belonging to the genus *Bacillus*, bacteria belonging to the genus *Rhizobium*, bacteria belonging to the genus *Arthrobacter*, bacteria belonging to the genus *Mycobacterium*, bacteria belonging to the genus *Rhodococcus*, bacteria belonging to the genus *Nocardia*, and bacteria belonging to the genus *Streptomyces*. Coryneform bacteria are more preferred.

The coryneform bacteria are not limited as long as they are classified into coryneform bacteria, and examples of the coryneform bacteria include bacteria belonging to the genus *Corynebacterium*, bacteria belonging to the genus *Brevibacterium*, and bacteria belonging to the genus *Arthrobacter*. Among these, bacteria belonging to the genus *Corynebacterium* or the genus *Brevibacterium* are preferred. Bacteria classified as *Corynebacterium glutamicum*, *Brevibacterium flavum*, *Brevibacterium* ammonia genes, or *Brevibacterium lactofermentum* are more preferred.

In cases where a succinic-acid-producing bacterium is used as the microorganism having a capacity to produce dicarboxylic acid, a strain having an enhanced pyruvate carboxylase activity and a decreased lactate dehydrogenase activity is preferably used.

Reaction conditions such as the reaction temperature and pressure in the microbial conversion depend on the activity of the microorganism such as bacterial cells or a mold selected. Preferred conditions for obtaining the dicarboxylic acid may be selected for each case.

The dicarboxylic acid used in the present invention is usually preferably one having less color. The yellowness (YI value) of the dicarboxylic acid component used in the present invention is usually preferably not more than 50, more preferably not more than 20, still more preferably not more than 10, still more preferably not more than 6, especially preferably not more than 4. On the other hand, the yellowness is usually preferably not less than −20, more preferably not less than −10, still more preferably not less than −5, especially preferably not less than −3, most preferably not less than −1.

By using a dicarboxylic acid having a YI value of not more than 50, coloring of the obtained polyurethane can be suppressed. On the other hand, in cases where a dicarboxylic acid component having a YI value of not less than −20 is used, neither an extremely high equipment investment nor a large amount of time is required for its production, so that economic advantages can be obtained.

The YI value in the present description is a value measured by a method according to JIS-K7105.

<1,10-Decanediol>

The 1,10-decanediol in the polyester polyol of the present embodiment is typically derived from a biomass resource. An aldehyde body is preferably contained in the 1,10-decanediol. The aldehyde body includes those having a structure in which a hydroxy group(s) of 1,10-decanediol is/are substituted by an aldehyde group(s). The aldehyde body content is calculated in terms of 1-hydroxy-10-decanal. The aldehyde body is obtained by hydrogenation reaction of sebacic acid or sebacate. In some cases, by-production of an aldehyde body occurs in the process of hydrogenation reaction. In such cases, the amount of aldehyde bodies may be controlled in the stage of production of 1,10-decanediol by increasing the amount of catalyst, increasing the residence time, and/or increasing the hydrogenation pressure, in the hydrogenation reaction.

The 1,10-decanediol is usually purified by distillation. However, since 1,10-decanediol and aldehyde bodies derived from 1,10-decanediol have close boiling points, reduction of the aldehyde bodies requires precise distillation.

In the method for producing polyester polyol of the present embodiment, the aldehyde body content in the 1,10-decanediol may be 0.01 to 1% by weight. The aldehyde body content is preferably not less than 0.02% by weight, more preferably not less than 0.03% by weight, still more preferably not less than 0.05% by weight. The aldehyde body content is preferably not more than 0.5% by weight, more preferably not more than 0.3% by weight, still more preferably not more than 0.2% by weight. In cases where the aldehyde body content is not less than 0.01% by weight, there is an advantage in that an increase in the production load and an increase in the cost can be suppressed in the stage of production of 1,10-decanediol, and, in particular, when the polyester polyol is used as a material of a urethane resin, the produced urethane resin tends to have an improved elongation at break, breaking strength, and solvent resistance. In cases where the aldehyde body content is not more than 1% by weight, preferably not more than 0.5% by weight, when 1,10-decanediol is used as a material of a polyester polyol, problems such as a decrease in the reactivity and deterioration of the color tone of the polyester polyol obtained by polycondensation tend to be alleviated.

The aldehyde body content in the 1,10-decanediol can be decreased by completing the hydrogenation reaction process when the 1,10-decanediol is obtained by hydrogenation reaction of sebacic acid or sebacate. On the other hand, since the aldehyde body content in the 1,10-decanediol increases by oxidation, the aldehyde body content in the 1,10-decanediol can be increased to a desired content before the production of the polyester polyol, by, for example, heating the 1,10-decanediol in a material reservoir or the like in the presence of oxygen, or using an oxidizing agent in advance to convert the 1,10-decanediol to aldehyde body. In the present embodiment, the aldehyde body content can be controlled by these methods and/or addition of aldehyde body as appropriate.

Further, in cases where the aldehyde body content in the 1,10-decanediol is not more than 1% by weight, preferably not more than 0.5% by weight, when the polyester polyol is used to produce a polyurethane, problems such as deterioration of the design of the resulting molded product due to coloring of the polyurethane, low molecular weight of the polyurethane, and low reactivity may be alleviated. Moreover, depending on the production conditions of the polyurethane, problems such as construction of cross-linked structures due to reaction of aldehyde bodies with hydroxyl termini and isocyanate, which causes gelation, may be alleviated.

When the polyester polyol is produced, one or more kinds of diol and/or polyol to be used as a chain extender(s) that is/are a material(s) of the later-mentioned polyurethane may be added together with the 1,10-decanediol. In such a case, the mixing ratio of the 1,10-decanediol is not limited as long as the 1,10-decanediol is contained. From the viewpoint of improving the properties of the polyurethane, the mixing ratio of the 1,10-decanediol is usually not less than 10 mol %, more preferably 30 mol %, still more preferably not less than 50 mol % with respect to the total molar amount of the diol used.

<Esterification Catalyst>

Examples of the esterification catalyst include compounds containing the metallic elements in the groups 1 to 14 of the periodic table excluding the hydrogen atom and the carbon atom. Specific examples of the catalyst include carboxylic acid salts containing at least one kind of metal selected from the group consisting of titanium, zirconium, tin, antimony, cerium, germanium, zinc, cobalt, manganese, iron, aluminum, magnesium, calcium, strontium, sodium, and potassium; compounds containing an organic group, such as metal alkoxides, organic sulfonic acid salts, and β-diketonate salts; inorganic compounds such as oxides and halides of the metals described above; and their mixtures.

It should be noted, that, in some cases, these catalyst components are contained in the material derived from the biomass resource because of the above reason. In such cases, the material may be used as it is as a material containing a metal, without performing purification.

Among the esterification catalysts, metal compounds containing titanium, zirconium, germanium, zinc, aluminum, magnesium, or calcium; and mixtures thereof; are preferred. In particular, titanium compounds, zirconium compounds, and germanium compounds are especially preferred. From the viewpoint of the fact that the catalyst can achieve a higher reaction rate when it is in a molten state or dissolved state during the esterification reaction, the catalyst is preferably a compound that is in a liquid state during the esterification reaction, or a compound that dissolves in the polyester polyol to be produced.

The titanium compounds are preferably tetraalkyl titanates. Specific examples of the tetraalkyl titanates include tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof.

Preferred examples of the titanium compounds include titanium(oxy)acetylacetonate, titanium tetraacetylacetonate, titanium(diisoproxide)acetylacetonate, titanium bis(ammonium lactate)dihydroxide, titanium bis(ethyl acetoacetate) diisopropoxide, titanium(triethanol aminate)isopropoxide, polyhydroxytitanium stearate, titanium lactate, titanium triethanol aminate, butyl titanate dimer, and titanium catalysts prepared by the method described in JP 5176415 B.

Other preferred examples of the titanium compounds include titanium oxide, and composite oxides containing titanium and silicon (for example, titania/silica composite oxides).

Among these, tetra-n-propyl titanate, tetraisopropyl titanate, tetra-n-butyl titanate, titanium(oxy)acetylacetonate, titanium tetraacetylacetonate, titanium bis(ammonium lactate) dihydroxide, polyhydroxytitanium stearate, titanium lactate, butyl titanate dimer, titanium oxide, and titania/silica composite oxides, and titanium catalysts prepared by the method described in JP 5176415 B are preferred; tetra-n-butyl titanate, titanium(oxy)acetylacetonate, titanium tetraacetylacetonate, polyhydroxytitanium stearate, titanium lactate, butyl titanate dimer, and titania/silica composite oxides, and titanium catalysts prepared by the method described in JP 5176415 B are more preferred; tetra-n-butyl titanate, polyhydroxytitanium stearate, titanium(oxy)acetylacetonate, titanium tetraacetylacetonate, and titania/silica composite oxides, and titanium catalysts prepared by the method described in JP 5176415 B are especially preferred.

Examples of the zirconium compounds include zirconium tetraacetate, zirconium acetate hydroxide, zirconium tris(butoxy)stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, and zirconium tributoxyacetylacetonate, and mixtures thereof.

Other preferred examples of the zirconium compounds include zirconium oxide, and composite oxides containing zirconium and silicon.

Among these, zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferred; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide are more preferred; zirconium tris(butoxy)stearate is especially preferred.

Specific examples of the germanium compounds include inorganic germanium compounds such as germanium oxide and germanium chloride; and organic germanium compounds such as tetraalkoxygermanium. From the viewpoint of the cost and the availability, germanium oxide, tetraethoxygermanium, tetrabutoxygermanium, and the like are preferred. Germanium oxide is especially preferred.

In cases where a metal compound is used as the esterification catalyst, the amount of the catalyst used is usually preferably not less than 1 ppm, more preferably not less than 3 ppm, and usually preferably not more than 30,000 ppm, more preferably not more than 1000 ppm, still more preferably not more than 250 ppm, especially preferably not more than 130 ppm, in terms of the weight concentration in terms of the metal with respect to the polyester polyol produced. In cases where the amount of the catalyst used is not more than 30,000 ppm, an economic advantage can be obtained, and, moreover, the thermal stability of the obtained polyester polyol can be increased. In cases where the amount of the catalyst used is not less than 1 ppm, the polymerization activity during the polyester polyol production reaction can be increased.

The esterification and/or transesterification reaction is/are preferably carried out in the presence of the esterification catalyst. The time of addition of the esterification catalyst is not limited. The esterification catalyst may be added when the material is fed, or may be added after removal of water to some extent, or at the beginning of the pressure reduction.

In cases where a dicarboxylic acid is used as a material, the material dicarboxylic acid itself shows a catalytic action. Thus, the reaction may be allowed to proceed without addition of a catalyst in the early phase of the reaction, and, depending on the production rate of the water produced, an esterification catalyst that is different from the material component may be added when the reaction rate has become insufficient. The esterification catalyst that is different from the material component is added preferably when the observed esterification reaction rate is not more than ⅓, more preferably when the observed esterification reaction rate is not more than ⅕, with respect to the esterification reaction rate in the early phase of the non-addition reaction, from the viewpoint of easier control of the reaction.

<Ratios of Materials and the Like Used>

The amount of the diol used for the production of the polyester polyol is substantially equimolar to the amount of a dihydroxy compound necessary for the number of moles of the dicarboxylic acid component to produce a polyester polyol having the desired molecular weight. In general, taking into account distillation of the diol during the esterification and/or transesterification reaction, the diol is preferably used in a larger amount by 0.1 to 25 mol %.

<Polyester Polyol>

The polyester polyol of the present embodiment is typically a polyester polyol produced by polycondensation of dicarboxylic acid with aliphatic diol, wherein the aliphatic diol may contain 1,10-decanediol, and wherein the polyester polyol may contain an aldehyde body and an acetal group generated by reaction of the aldehyde group with a hydroxy group.

The content of 1,10-decanediol units in the aliphatic diol units is usually not less than 10 mol %, more preferably 30 mol %, still more preferably not less than 50 mol % with respect to the total molar amount of the constituting diol units.

<Aldehyde Bodies in Polyester Polyol>

The aldehyde body content in the polyester polyol of the present embodiment is calculated by regarding one aldehyde group as one molecule of 1-hydroxy-10-decanal. The aldehyde body content in the polyester polyol may be 0.01 to 1% by weight in terms of the weight of aldehyde bodies. The aldehyde body content is preferably not less than 0.03% by weight, more preferably not less than 0.05% by weight. The aldehyde body content is preferably not more than 0.5% by weight, more preferably not more than 0.3% by weight, still more preferably not more than 0.2% by weight.

By using a polyester polyol having an aldehyde body content of not less than 0.01% by weight as a material for a polyurethane, the reactivity during the polyurethane polymerization can be improved, and a polyurethane having an excellent balance of flexibility, mechanical strength, chemical resistance, and heat resistance can be obtained.

On the other hand, in cases where the aldehyde body content in the polyester polyol is not less than 1% by weight, the balance of the physical properties of the polyurethane tends to be deteriorated because of, for example, deterioration of the color tone of the polyester polyol and decreases in the flexibility, mechanical strength, and chemical resistance of the polyurethane prepared using the polyester polyol as a material.

Although details of the mechanism by which the physical properties of the polyurethane are influenced by aldehyde bodies contained in the polyester polyol of the present embodiment are not clear, the mechanism can be assumed as follows.

That is, the presence of an appropriate amount of aldehyde bodies in the polyester polyol during the polyurethane polymerization allows formation of acetal by reaction of the aldehyde bodies with the polyester polyol, resulting in elongation of the molecular chain in the soft segment, which can give the flexibility. On the other hand, hydroxyl groups of hemiacetal formed by the reaction react with polyisocyanate to cause partial cross-linking, which can improve the mechanical strength, chemical resistance, and hydrolysis resistance.

Thus, in the present embodiment, by controlling the aldehyde body content in the polyester polyol to 0.01 to 1% by weight, preferably 0.01 to 0.5% by weight, a polyurethane to which flexibility is given and which has well-balanced physical properties with excellent mechanical strength and durability can be produced.

Examples of the method for controlling the aldehyde body content in the polyester polyol include the above-described method in which 1,10-decanediol containing an aldehyde body is used as a material to produce a polyester polyol, as well as a method in which the oxygen concentration in the reaction vessel is controlled during the polycondensation or after the polycondensation of the polyester polyol to increase aldehyde bodies, and a method in which a polyester polyol is subjected to oxidation using an oxidizing agent such as 2,2,6,6-tetramethylpiperidine-1-oxyl radical or a hypervalent iodine compound, to reduction using a reducing agent such as sodium borohydride, or to hydrogen catalytic reduction using a metal catalyst. Thus, in the present embodiment, control of the aldehyde body content in the polyester polyol can be achieved by appropriate combination of a method using as a material 1,10-decanediol containing an aldehyde body and a method in which the oxygen concentration during the polycondensation and/or after the polycondensation is controlled. Of course, the aldehyde body content may also be controlled by separately adding aldehyde bodies as a material in the polyester polyol polycondensation.

On the other hand, the content of acetal groups in terms of the molar ratio to the aldehyde bodies in the polyester polyol is usually not less than 0.01, preferably not less than 0.1, more preferably not less than 1, and usually not more than 1000, preferably not more than 100, more preferably not more than 30, still more preferably not more than 10. By controlling their contents, a favorable reactivity during the polyurethane polymerization can be achieved, and a polyurethane having an excellent balance of flexibility, mechanical strength, chemical resistance, and heat resistance can be produced in some cases.

<Hydroxyl Value of Polyester Polyol>

The lower limit of the hydroxyl value of the polyester polyol of the present embodiment is, for example, 20 mg-KOH/g, preferably 25 mg-KOH/g, more preferably 30 mg-KOH/g, still more preferably 35 mg-KOH/g. The upper limit of the hydroxyl value of the polyester polyol is 450 mg-KOH/g, preferably 230 mg-KOH/g, more preferably 200 mg-KOH/g, still more preferably 170 mg-KOH/g, still more preferably 150 mg-KOH/g, especially preferably 130 mg-KOH/g, most preferably 120 mg-KOH/g. In cases where the hydroxyl value is not less than the lower limit, problems such as possible difficulty in handling upon the polyurethane production due to too much viscosity tend to be alleviated, and, in cases where the hydroxyl value is not more than the upper limit, problems such as possible insufficiency of physical properties, for example, flexibility and low-temperature properties, of the resulting polyurethane tend to be alleviated.

<Molecular Weight and Molecular Weight Distribution of Polyester Polyol>

The lower limit of the number average molecular weight (Mn) of the polyester polyol of the present embodiment as calculated from the hydroxyl value is, for example, 250, preferably 300, more preferably 400. On the other hand, the upper limit of the number average molecular weight (Mn) of the polyester polyol is, for example, 5,000, preferably 4,000, more preferably 3,000. In cases where Mn of the polyester polyol is not less than the lower limit, problems such as possible insufficiency of flexibility of the resulting polyurethane tend to be alleviated. On the other hand, in cases where Mn of the polyester polyol is not more than the upper limit, problems such as possible deterioration of handling upon the polyurethane production due to increased viscosity tend to be alleviated.

The weight average molecular weight/number average molecular weight (Mw/Mn) as the molecular weight distribution of the polyester polyol of the present embodiment is not limited. Its lower limit is preferably 1.5, more preferably 1.8. The upper limit of the weight average molecular weight/number average molecular weight (Mw/Mn) is preferably 3.5, more preferably 3.0. In cases where the molecular weight distribution is not more than the upper limit, problems in physical properties of the polyurethane produced using this polyester polyol, such as hardness and poor elongation at low temperature tend to be alleviated. In cases where the molecular weight distribution is not less than the lower limit, problems such as requirement of a high-level purification operation such as removal of oligomers in production of the polyester polyol tend to be alleviated.

In the calculation of the molecular weight distribution, the weight average molecular weight is the weight average molecular weight in terms of polystyrene, and the number average molecular weight is the number average molecular weight in terms of polystyrene. They can be usually calculated by measurement by gel permeation chromatography (which may be simply referred to as GPC).

<Color Tone of Polyester Polyol>

The color tone of the polyester polyol may be evaluated by, for example, visual observation of the color tone, or may be quantitatively evaluated by measuring the APHA value according to JIS K0071-1 (1988). The APHA value of the polyester polyol is preferably not more than 50, more preferably not more than 40, still more preferably not more than 20. In cases of the visual observation, the color of the polyester polyol can be preferably recognized as while.

[2. Method for Producing Polyurethane]

Another embodiment of the present invention relates to a polyurethane.

Using the above-described polyester polyol according to an embodiment of the present invention, a polyurethane can be produced.

In the present embodiment, in the method for producing the polyurethane using the polyester polyol, known reaction conditions for polyurethane production that are normally used for producing polyurethane are used.

For example, by reacting the polyester polyol, polyisocyanate, and a chain extender at a temperature within the range of normal temperature to 200° C., the polyurethane can be produced.

Alternatively, by first reacting the polyester polyol and excess polyisocyanate to produce a prepolymer having an isocyanate group(s) at its terminus/termini, and then using the chain extender to increase the degree of polymerization, the polyurethane can be produced.

<Polyisocyanate>

Examples of the polyisocyanate used for the production of the polyurethane using the polyester polyol include various known aliphatic, alicyclic, and aromatic polyisocyanate compounds.

Examples of the polyisocyanate compounds include aliphatic diisocyanates such as tetramethylene diisocyanate, pentamethylene diisocyanate, hexamethylene diisocyanate, 2,2,4-trimethylhexamethylene diisocyanate, 2,4,4-trimethylhexamethylene diisocyanate, lysine diisocyanate, and dimer diisocyanates produced by conversion of a carboxyl group(s) in a dimer acid to an isocyanate group(s); alicyclic diisocyanates such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate, and 1,3-bis(isocyanatomethyl) cyclohexane; and aromatic diisocyanates such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenyl isocyanate, phenylene diisocyanate, and m-tetramethylxylylene diisocyanate. These may be used individually, or two or more of these may be used in combination.

Among these, 4,4'-diphenylmethane diisocyanate, pentamethylene diisocyanate, hexamethylene diisocyanate, 4,4'-dicyclohexylmethane diisocyanate, and isophorone diisocyanate are preferred since polyurethane obtained from these compounds has a favorable balance of physical properties, and these compounds can be industrially obtained in large amounts at low cost.

<Chain Extender>

The chain extender used for production of the polyurethane by the later-described two-step method is, in cases of production of the later-described prepolymer having an isocyanate group, a low-molecular-weight compound having at least two active hydrogens that react with the isocyanate group. Examples of the chain extender normally include polyols and polyamines.

Specific examples of the chain extender include linear diols such as ethylene glycol, 1,3-propanediol, 1,4-butanediol, 1,5-pentanediol, 1,6-hexanediol, 1,8-octanediol, 1,9-nonanediol, 1,10-decanediol, and 1,12-dodecanediol; diols having a branched chain, such as 2-methyl-1,3-propanediol, 2,2-dimethyl-1,3-propanediol, 2,2-diethyl-1,3-propanediol, 2-methyl-2-propyl-1,3-propanediol, 2-methyl-1,4-butanediol, 2,4-heptanediol, 1,4-dimethylol hexane, 2-ethyl-1,3-hexanediol, 2,2,4-trimethyl-1,3-pentanediol, 2-methyl-1,8-octanediol, 2-butyl-2-ethyl-1,3-propanediol, and dimer diol; diols having an ether group, such as diethylene glycol and propylene glycol; diols having an alicyclic structure, such as 1,4-cyclohexanediol, 1,4-cyclohexanedimethanol, and 1,4-dihydroxyethylcyclohexane; diols having an aromatic group, such as xylylene glycol, 1,4-dihydroxyethylbenzene, and 4,4'-methylenebis(hydroxyethyl benzene); polyols such as glycerin, trimethylolpropane, and pentaerythritol; hydroxyamines such as N-methylethanolamine and N-ethylethanolamine; polyamines such as ethylene diamine, 1,3-diaminopropane, hexamethylene diamine, triethylene tetramine, diethylene triamine, isophorone diamine, 4,4'-diaminodicyclohexylmethane, 2-hydroxyethyl propylene diamine, di-2-hydroxyethyl ethylene diamine, di-2-hydroxyethyl propylene diamine, 2-hydroxypropyl ethylene diamine, di-2-hydroxypropyl ethylene diamine, 4,4'-diphenylmethane diamine, methylene bis(o-chloroaniline), xylylene diamine, diphenyldiamine, tolylenediamine, hydrazine, piperazine, and N,N'-diaminopiperazine; and water.

These chain extenders may be used individually, or two or more of these may be used in combination. Among these, 1,4-butanediol, 1,5-pentanediol, 1,6-hexanediol, 1,8-octanediol, 1,9-nonanediol, 1,10-decanediol, 1,4-cyclohexanedimethanol, 1,4-dihydroxyethylcyclohexane, ethylene diamine, 1,3-diaminopropane, isophorone diamine, and 4,4'-diaminodicyclohexylmethane are preferred since polyurethane obtained from these compounds has a favorable balance of physical properties, and these compounds can be industrially obtained in large amounts at low cost.

The chain extender in cases of production of the later-described prepolymer having a hydroxyl group is a low-molecular-weight compound having at least two isocyanate groups. Specific examples of the compound include the compounds described in the <Polyisocyanate> section.

<Chain Stopper>

In the production of the polyurethane, a chain stopper having one active hydrogen group may be used, if necessary, for the purpose of controlling the molecular weight of the polyurethane obtained.

Examples of the chain stopper include aliphatic monools having one hydroxyl group, such as methanol, ethanol, propanol, butanol, and hexanol; and aliphatic monoamines having one amino group, such as diethylamine, dibutylamine, n-butylamine, monoethanolamine, diethanolamine, and morpholine.

These may be used individually, or two or more of these may be used in combination.

<Catalyst>

In the polyurethane-forming reaction for production of the polyurethane, a known urethane polymerization catalyst represented by, for example, amine-based catalysts such as triethylamine, N-ethylmorpholine, and triethylenediamine; acid-based catalysts such as acetic acid, phosphoric acid, sulfuric acid, hydrochloric acid, and sulfonic acid; tin-based catalysts such as trimethyltin laurate, dibutyltin dilaurate, dioctyltin dilaurate, and dioctyltin dineodecanate; and organic metal salts such as titanium-based compounds; may also be used. As the urethane polymerization catalyst, these may be used individually, or two or more of these may be used in combination.

<Polyols Other than Polyester Polyol of Present Embodiment>

In the polyurethane-forming reaction for production of the polyurethane, another polyol may be used in combination with the polyester polyol of the present embodiment, if necessary. The polyol other than the polyester polyol herein is not limited as long as it is normally used for production of polyurethane. Examples of such a polyol include polyether polyols, polycarbonate polyols, polycaprolactone polyols, and polyester polyols other than the present embodiment. For example, in cases where a polycarbonate polyol is used in combination, a polyurethane in which the polyester polyol has improved durability can be prepared. The weight ratio of the polyester polyol of the present embodiment to the total weight of the polyester polyol of the present embodiment and the other polyol is preferably not less than 70%, more preferably not less than 90%. In cases where the weight ratio of the polyester polyol of the present embodiment is too small, the polycarbonate diol has high viscosity. This leads to difficulty in handling, and hence the productivity of the polyurethane is adversely affected.

In the present embodiment, the production of the polyurethane may also be carried out after modification of the polyester polyol. Examples of the method for the modification of the polyester polyol include methods in which an epoxy compound(s) such as ethylene oxide, propylene oxide, and/or butylene oxide is/are added to the polyester polyol for introduction of an ether group(s). In the ether modification, modification by ethylene oxide, propylene oxide, or the like causes a decrease in the viscosity of the polyester polyol, which is preferred from the viewpoint of ease of handling and the like. In particular, modification by ethylene oxide or propylene oxide causes a decrease in the crystallinity of the polyester polyol, and hence the flexibility at low temperature is improved. In cases of modification by ethylene oxide, polyurethane produced using the ethylene oxide-modified polyester polyol has increased water absorption capacity and moisture permeability, so that the polyurethane can have a better performance as an artificial leather/synthetic leather or the like. However, the larger the amount of the ethylene oxide or propylene oxide added, the poorer properties such as the mechanical strength, heat resistance, chemical resistance, and the like of the polyurethane produced using the modified polyester polyol, so that the amount of the ethylene oxide or propylene oxide added with respect to the polyester polyol is preferably 5 to 50% by weight, more preferably 5 to 40% by weight, still more preferably 5 to 30% by weight.

<Solvent>

In the polyurethane-forming reaction for production of the polyurethane, a solvent may be used.

Preferred examples of the solvent include amide-based solvents such as dimethylformamide, diethylformamide, dimethylacetamide, and N-methylpyrrolidone; sulfoxide-based solvents such as dimethyl sulfoxide; ketone-based solvents such as methyl ethyl ketone, cyclohexanone, and methyl isobutyl ketone; ether-based solvents such as tetrahydrofuran and dioxane; ester-based solvents such as methyl acetate, ethyl acetate, and butyl acetate; and aromatic hydrocarbon-based solvents such as toluene and xylene. These solvents may be used either individually or as a mixed solvent of two or more of these.

Among these, the following organic solvents are preferred: methyl ethyl ketone, ethyl acetate, toluene, dimethylformamide, dimethylacetamide, N-methylpyrrolidone, and dimethyl sulfoxide.

A water dispersion of polyurethane can also be produced from a polyurethane composition containing polyester polyol, polydiisocyanate, and the above chain extender.

<Method for Producing Polyurethane>

As a method for producing a polyurethane using the above reaction reagents, a production method that is generally used for an experimental or industrial purpose may be employed.

Examples of the method include a method in which the polyester polyol of the present embodiment, another polyol, polyisocyanate, and a chain extender are mixed together at once, and the resulting mixture is reacted (which may be hereinafter referred to as "one-step method"), and a method in which the polyester polyol of the present embodiment is first reacted with another polyol and polyisocyanate to prepare a prepolymer having isocyanate groups at both ends, and the resulting prepolymer is reacted with a chain extender (which may be hereinafter referred to as "two-step method").

The two-step method is carried out through a process in which the polyester polyol of the present embodiment and the other polyol are preliminarily reacted with not less than 1 equivalent of polyisocyanate, to prepare an intermediate whose both ends are isocyanate, which corresponds to the soft segment of the polyurethane. Thus, in cases where a prepolymer is first prepared and then reacted with a chain extender, the molecular weight of the soft segment portion can be easily controlled in some cases, so that the method is useful in cases where phase separation of the soft segment and the hard segment needs to be securely carried out.

<One-Step Method>

The one-step method is also called one-shot method. This is a method in which the polyester polyol of the present embodiment, another kind of polyol, polyisocyanate, and a chain extender are fed at once to perform the reaction.

The amount of the polyisocyanate used in the one-step method is not limited. When the total of the total number of hydroxyl groups in the polyester polyol of the present embodiment and the other polyol, and the numbers of hydroxyl groups and amino groups in the chain extender, is defined as 1 equivalent, the lower limit of the amount of the polyisocyanate used is preferably 0.7 equivalent, more preferably 0.8 equivalent, still more preferably 0.9 equivalent, especially preferably 0.95 equivalent, and the upper limit is preferably 3.0 equivalents, more preferably 2.0 equivalents, still more preferably 1.5 equivalents, especially preferably 1.1 equivalents.

In cases where the amount of the polyisocyanate used is too large, unreacted isocyanate groups tend to cause side reaction, resulting in high viscosity of the resulting polyurethane and hence in difficulty in handling or deterioration of flexibility. In cases where the amount of the polyisocyanate used is too small, the molecular weight of the polyurethane tends to be insufficient, resulting in insufficient polyurethane strength.

The amount of the chain extender used is not limited. When the number calculated by subtracting the number of isocyanate groups in the polyisocyanate from the total number of hydroxyl groups in the polyester polyol of the present embodiment and the other polyol is defined as 1 equivalent, the lower limit is preferably 0.7 equivalent, more preferably 0.8 equivalent, still more preferably 0.9 equivalent, especially preferably 0.95 equivalent, and the upper limit is preferably 3.0 equivalents, more preferably 2.0 equivalents, still more preferably 1.5 equivalents, especially preferably 1.1 equivalents. In cases where the amount of the chain extender used is too large, the resulting polyurethane tends to be less soluble in the solvent, leading to difficulty in its processing. In cases where the amount of the chain extender used is too small, the resulting polyurethane may be too soft, and may therefore have insufficient strength, hardness, elastic recovery performance, and/or elasticity-retaining performance, and/or show poor heat resistance.

<Two-Step Method>

The two-step method is also called prepolymer method. The two-step method mainly includes the following methods:

(a) a method in which the polyester polyol of the present embodiment and the other polyol are preliminarily reacted with excess polyisocyanate at a reaction equivalent ratio of polyisocyanate/(polyester polyol of the present embodiment and the other polyol) of more than 1 and not more than 10.0, to produce a prepolymer whose molecular chain termini are isocyanate groups, and then a chain extender is added thereto to produce a polyurethane; and (b) a method in which polyisocyanate is reacted with excess polyester polyol and the other polyol at a reaction equivalent ratio of polyisocyanate/(polyester polyol of the present embodiment and the other polyol) of not less than 0.1 and less than 1.0, to produce a prepolymer whose molecular chain termini are hydroxyl groups, and then the prepolymer is reacted with polyisocyanate whose termini are isocyanate groups as a chain extender, to produce a polyurethane.

The two-step method can be carried out either in the absence of a solvent, or in the presence of a solvent.

The production of the polyurethane by the two-step method can be carried out by any of the following methods (1) to (3).
(1) First, polyisocyanate, the polyester polyol of the present embodiment, and the other polyol are directly reacted with each other without use of a solvent to synthesize a prepolymer, and the synthesized prepolymer is used as it is for the chain extension reaction.
(2) A prepolymer is synthesized by the method (1), and the synthesized prepolymer is dissolved in a solvent, followed by its use in the later chain extension reaction.
(3) Using a solvent from the beginning, polyisocyanate, the polyester polyol of the present embodiment, and the other polyol are reacted with each other, followed by performing the chain extension reaction.

In the cases of the method (1), the polyurethane is preferably obtained in a state where a solvent coexists, by, for example, a method in which the chain extender is dissolved in the solvent for the chain extension reaction, or a method in which the prepolymer and the chain extender are dissolved in the solvent at once.

The amount of the polyisocyanate used in the two-step method (a) is not limited. When the total number of hydroxyl groups in the polyester polyol and the other polyol is defined as 1 equivalent, the lower limit is preferably more than 1.0 equivalent, more preferably 1.2 equivalents, still more preferably 1.5 equivalents, and the upper limit is preferably 10.0 equivalents, more preferably 5.0 equivalents, still more preferably 3.0 equivalents, in terms of the number of isocyanate groups.

In cases where the amount of the isocyanate used is too large, the excess isocyanate groups tend to cause side reaction, so that the desired physical properties of the polyurethane may not be achieved, while in cases where the amount of the isocyanate used is too small, the molecular weight of the resulting polyurethane may be insufficient, so that the strength and the thermal stability may be low.

The amount of the chain extender used is not limited. When the number of isocyanate groups contained in the prepolymer is defined as 1 equivalent, the lower limit is preferably 0.1 equivalent, more preferably 0.5 equivalent, still more preferably 0.8 equivalent, and the upper limit is preferably 5.0 equivalents, more preferably 3.0 equivalents, still more preferably 2.0 equivalents.

The chain extension reaction may be carried out in the presence of a monofunctional organic amine(s) and/or an alcohol(s) for the purpose of controlling the molecular weight.

The amount of the polyisocyanate used for preparing the prepolymer whose termini are hydroxyl groups in the two-step method (b) is not limited. When the total number of hydroxyl groups in the polyester polyol and the other polyol is defined as 1 equivalent, the lower limit is preferably 0.1 equivalent, more preferably 0.5 equivalent, still more preferably 0.7 equivalent, and the upper limit is preferably 0.99 equivalent, more preferably 0.98 equivalent, still more preferably 0.97 equivalent, in terms of the number of isocyanate groups.

In cases where the amount of the isocyanate used is too small, the process to obtain a desired molecular weight in the subsequent chain extension reaction tends to take a long time, resulting in a low production efficiency, while in cases where the amount is too large, the viscosity may be too high, so that the resulting polyurethane may have low flexibility, and/or the productivity may be low because of difficulty in handling.

The amount of the chain extender used is not limited. When the total number of hydroxyl groups in the polyester polyol and the other polyol used for the prepolymer is defined as 1 equivalent, the lower limit is preferably 0.7 equivalent, more preferably 0.8 equivalent, still more preferably 0.9 equivalent, and the upper limit is preferably less than 1.0 equivalent, more preferably 0.99 equivalent, still more preferably 0.98 equivalent, in terms of the total equivalence including the equivalence of the isocyanate groups used for the prepolymer.

The chain extension reaction may be carried out in the presence of a monofunctional organic amine(s) and/or an alcohol(s) for the purpose of controlling the molecular weight.

The chain extension reaction is usually carried out at 0° C. to 250° C. The temperature is not limited, and may vary depending on the amount of the solvent, reactivity of the materials used, the reaction equipment, and the like. In cases where the temperature is too low, the reaction may proceed only slowly, or the production time may be long because of low solubility of a material(s) and/or the polymerization product. In cases where the temperature is too high, side reaction or degradation of the resulting polyurethane may occur. The chain extension reaction may be carried out with defoaming under reduced pressure.

In the chain extension reaction, a catalyst, stabilizer, and/or the like may be added, if necessary.

Examples of the catalyst include compounds such as triethylamine, tributylamine, dibutyltin dilaurate, stannous octoate, acetic acid, phosphoric acid, sulfuric acid, hydrochloric acid, and sulfonic acid. These may be used individually, or two or more of these may be used in combination. Examples of the stabilizer include compounds such as 2,6-dibutyl-4-methylphenol, distearyl thiodipropionate, N,N'-di-2-naphthyl-1,4-phenylenediamine, and tris(dinonylphenyl)phosphite. These may be used individually, or two or more of these may be used in combination. In cases where the chain extender is a compound having high reactivity such as a short-chain aliphatic amine, the reaction may be carried out without addition of a catalyst.

<Polyurethane>

Since the polyurethane of the present embodiment contains the polyester polyol of the present embodiment, the polyurethane contains an aldehyde body derived from the polyester polyol, and an acetal group generated by reaction of the aldehyde group with a hydroxy group.

The aldehyde body content is usually 0.01 to 1% by weight, and may be 0.01 to 0.5% by weight, preferably 0.03% by weight to 0.5% by weight, more preferably 0.05% by weight to 0.3% by weight, still more preferably 0.05% by weight to 0.2% by weight.

On the other hand, the content of acetal groups in terms of the molar ratio to the aldehyde bodies in the polyester polyol is usually 0.01 to 1000, preferably 0.1 to 100, more preferably 1 to 30, especially preferably 1 to 10. By controlling their contents, a polyurethane having properties with an excellent balance of flexibility, mechanical strength, chemical resistance, and heat resistance can be obtained.

<Aqueous Polyurethane Emulsion>

Using the polyester polyol of the present embodiment, an aqueous polyurethane emulsion can be produced.

In such a case, when a prepolymer is produced by reacting a polyol containing the polyester polyol with excess polyisocyanate, the prepolymer is formed by mixing with a compound having at least one hydrophilic functional group and at least two isocyanate-reactive groups, and the resulting prepolymer is processed through the steps of neutralization/ salification of the hydrophilic functional group(s), emulsification by water addition, and chain extension reaction to produce the aqueous polyurethane emulsion.

The hydrophilic functional group of the compound having at least one hydrophilic functional group and at least two isocyanate-reactive groups to be used herein is an alkaline, neutralizable group such as a carboxyl group or a sulfonic acid group. The isocyanate-reactive group is a group which generally reacts with isocyanate to form a urethane bond or a urea bond, such as a hydroxyl group, primary amino group, or secondary amino group. Each single molecule may have any combination of these groups.

Specific examples of the compound having at least one hydrophilic functional group and at least two isocyanate-reactive groups include 2,2'-dimethylolpropionic acid, 2,2-methylolbutyric acid, and 2,2'-dimethylolvaleric acid. Other examples of such as compound include diaminocarboxylic acids such as lysine, cystine, and 3,5-diaminocarboxylic acid. These may be used individually, or two or more of these may be used in combination. When these are practically used, they may be used after neutralization with an amine such as trimethylamine, triethylamine, tri-n-propylamine, tributylamine, or triethanolamine; or with an alkaline compound such as sodium hydroxide, potassium hydroxide, or ammonia.

In cases where an aqueous polyurethane emulsion is produced, the lower limit of the amount of the compound having at least one hydrophilic functional group and at least two isocyanate-reactive groups used is preferably 1% by weight, more preferably 5% by weight, still more preferably 10% by weight with respect to the total weight of the polyester polyol of the present embodiment and the other polyol, from the viewpoint of increasing dispersibility in water. On the other hand, in cases where this compound is added too much, the properties of the polyester polyol of the present embodiment may not be maintained. Thus, the upper limit is preferably 50% by weight, more preferably 40% by weight, still more preferably 30% by weight.

In cases where an aqueous polyurethane emulsion is produced, the reaction in the prepolymer step may be carried out in the presence of a solvent such as methyl ethyl ketone, acetone, or N-methyl-2-pyrrolidone, or may be carried out in the absence of a solvent. In cases where a solvent is used, the solvent is preferably removed by distillation after the production of the aqueous emulsion.

When the aqueous polyurethane emulsion is produced using the polyester polyol of the present embodiment as a material in the absence of a solvent, the upper limit of the number average molecular weight as calculated from the hydroxyl value of the polyester polyol is preferably 5000, more preferably 4500, still more preferably 4000. The lower limit of the number average molecular weight is preferably 300, more preferably 500, still more preferably 800. In cases where the number average molecular weight calculated from the hydroxyl value is higher than 5000 or lower than 300, emulsification may be difficult in some cases.

In the synthesis or storage of the aqueous polyurethane emulsion, the emulsion stability may be maintained by combined use of an anionic surfactant(s) represented by higher fatty acids, resin acids, acidic fatty alcohols, sulfuric acid esters, higher alkyl sulfonates, alkyl aryl sulfonates, sulfonated castor oils, and sulfosuccinic acid esters; a cationic surfactant(s) represented by primary amine salts, secondary amine salts, tertiary amine salts, quaternary amine salts, and pyridinium salts; and/or a nonionic surfactant(s) represented by known reaction products of ethylene oxide and long-chain fatty alcohol or phenol.

In the preparation of the aqueous polyurethane emulsion, the emulsion can also be produced by mechanically mixing a solution of the prepolymer in an organic solvent with water at a high shear rate without, as appropriate, the neutralization/salification step, in the presence of an emulsifier.

The aqueous polyurethane emulsion produced in this way can be used for a variety of uses. In particular, since chemical materials with low environmental loads have been demanded in recent years, the aqueous polyurethane emulsion may be used as an alternative to conventional products, for the purpose of avoiding use of organic solvents.

Specific preferred examples of uses of the aqueous polyurethane emulsion include coating agents, aqueous paints, adhesives, synthetic leathers, and artificial leathers.

<Additives>

An additive(s) such as a heat stabilizer, light stabilizer, coloring agent, filler, stabilizer, UV absorber, antioxidant, anti-adhesion agent, flame retardant, anti-aging agent, and/or inorganic filler may be added to, or mixed with the polyurethane produced using the polyester polyol of the present embodiment as long as the properties of the polyurethane of the present embodiment are deteriorated.

Examples of compounds that can be used as the heat stabilizer include phosphorus compounds such as phosphoric acid, aliphatic-, aromatic-, or alkyl-substituted aromatic esters of phosphorous acid, hypophosphorous acid derivatives, phenylphosphonic acid, phenylphosphinic acid, diphenylphosphonic acid, polyphosphonate, dialkyl pentaerythritol diphosphite, and dialkyl bisphenol A diphosphite; phenol derivatives, particularly hindered phenol compounds; sulfur-containing compounds such as thioether compounds, dithioic acid salt compounds, mercaptobenzimidazole compounds, thiocarbanilide compounds, and thiodipropionic acid ester compounds; and tin-based compounds such as tin maleate and dibutyltin monoxide.

Specific examples of the hindered phenol compounds include "Irganox 1010" (trade name; manufactured by BASF Japan Ltd.), "Irganox 1520" (trade name; manufactured by BASF Japan Ltd.), and "Irganox 245" (trade name; manufactured by BASF Japan Ltd.).

Examples of the phosphorus compounds include "PEP-36", "PEP-24G", and "HP-10" (all of these are trade names; manufactured by ADEKA Corporation); and "Irgafos 168" (trade name; manufactured by BASF Japan Ltd.).

Specific examples of the sulfur-containing compounds include thioether compounds such as dilaurylthiopropionate (DLTP) and distearylthiopropionate (DSTP).

Examples of the light stabilizer include benzotriazole compounds and benzophenone compounds. Specific examples of the light stabilizer that may be used include "TINUVIN 622LD" and "TINUVIN765" (which are manufactured by Ciba Specialty Chemicals K.K.), and "SANOL LS-2626" and "SANOL LS-765" (which are manufactured by Sankyo Co., Ltd.).

Examples of the UV absorber include "TINUVIN 328" and "TINUVIN 234" (which are manufactured by Ciba Specialty Chemicals K.K.).

Examples of the coloring agent include dyes such as direct dyes, acidic dyes, basic dyes, and metal complex salt dyes; inorganic pigments such as carbon black, titanium oxide, zinc oxide, iron oxide, and mica; and organic pigments such as coupling azo pigments, condensed azo pigments, anthraquinone pigments, thioindigo pigments, dioxazone pigments, and phthalocyanine pigments.

Examples of the inorganic filler include short glass fibers, carbon fibers, alumina, talc, graphite, melamine, and white clay.

Examples of the flame retardant include additive/reactive flame retardants such as phosphorus- or halogen-containing organic compounds, bromine- or chlorine-containing organic compounds; ammonium polyphosphate; aluminum hydroxide; and antimony oxide.

These additives may be used either individually or as an arbitrary combination in which two or more of them are included at arbitrary ratios.

The lower limit of the amount of the additive(s) added is preferably 0.01% by weight, more preferably 0.05% by weight, still more preferably 0.1% by weight, and the upper limit is preferably 10% by weight, more preferably 5% by weight, still more preferably 1% by weight, in terms of the weight ratio to the polyurethane. In cases where the amount of the additive(s) is too small, the effect of the addition cannot be sufficiently obtained, while in cases where the amount is too large, precipitation or generation of turbidity may occur in the polyurethane.

<Polyurethane Film and Polyurethane Plate>

In cases where a film is produced using the polyurethane of the present embodiment, the lower limit of the thickness of the film is preferably 10 µm, more preferably 20 µm, still more preferably 30 µm, and the upper limit is preferably 1000 µm, more preferably 500 µm, still more preferably 100 µm.

In cases where the thickness of the film is too large, sufficient moisture permeability tends not to be obtained, while in cases where the thickness is too small, pinholes tend to be formed, and the film tends to cause blocking, leading to difficulty in handling.

<Molecular Weight of Polyurethane>

The molecular weight of the polyurethane of the present embodiment is not limited, and appropriately controlled depending on the use thereof. The molecular weight of the polyurethane calculated as the weight average molecular weight (Mw) in terms of polystyrene as measured by GPC is preferably 50,000 to 500,000, more preferably 100,000 to 300,000. In cases where the Mw is smaller than the lower limit, sufficient strength and hardness may not be obtained, while in cases where the Mw is larger than the upper limit, handling performances such as the processability tend to be deteriorated.

<Oleic Acid Resistance>

In evaluation of the polyurethane of the present embodiment by, for example, a method described in the later-described Examples section, the ratio (%) of the change in the weight of the polyurethane test piece after immersion in oleic acid to the weight of the polyurethane test piece before the immersion in oleic acid is preferably not more than 80%, more preferably not more than 60%, still more preferably not more than 50%, especially preferably not more than 45%, most preferably not more than 35%.

In cases where the weight change ratio is higher than the upper limit, sufficient oleic acid resistance may not be obtained.

<Ethanol Resistance>

In evaluation of the polyurethane of the present embodiment by, for example, a method described in the later-described Examples section, the ratio (%) of the change in the weight of the polyurethane test piece after immersion in ethanol to the weight of the polyurethane test piece before the immersion in ethanol is preferably not more than 15%, more preferably not more than 10%, still more preferably not more than 8%, especially preferably not more than 6%, most preferably not more than 5%.

In cases where the weight change ratio is higher than the upper limit, sufficient ethanol resistance may not be obtained.

<Ethyl Acetate Resistance>

In evaluation of the polyurethane of the present embodiment by, for example, a method described in the later-described Examples section, the ratio (%) of the change in the weight of the polyurethane test piece after immersion in ethyl acetate to the weight of the polyurethane test piece before the immersion in the reagent is preferably not more than 50%, more preferably not more than 40%, still more preferably not more than 35%.

In cases where the weight change ratio is higher than the upper limit, a desired chemical resistance may not be obtained.

<Tensile Elongation at Break>

When the tensile elongation at break of the polyurethane of the present embodiment is evaluated for a strip-shaped sample having a width of 10 mm, length of 100 mm, and thickness of about 50 to 100 µm with a chuck distance of 50 mm and a pulling rate of 500 mm/minute at a temperature of 23° C. at a relative humidity of 50%, the lower limit of the tensile elongation at break is preferably 400%, more preferably 500%, still more preferably 600%, and the upper limit is preferably 900%, more preferably 850%, still more preferably 800%. In cases where the tensile elongation at break is lower than the lower limit, handling performances such as the processability tend to be deteriorated. In cases where the tensile elongation at break is higher than the upper limit, sufficient chemical resistance may not be obtained.

<100% Modulus>

When the 100% modulus of the polyurethane of the present embodiment is evaluated for a strip-shaped sample having a width of 10 mm, length of 100 mm, and thickness of about 50 to 100 µm with a chuck distance of 50 mm and a pulling rate of 500 mm/minute at a temperature of 23° C. at a relative humidity of 50%, the lower limit of the 100% modulus is preferably 0.1 MPa, more preferably 0.5 MPa, still more preferably 1 MPa, and the upper limit is preferably 20 MPa, more preferably 10 MPa, still more preferably 7 MPa. In cases where the 100% modulus is lower than the lower limit, the chemical resistance may be insufficient. In cases where the 100% modulus is higher than the upper limit, the flexibility tends to be insufficient, and/or handling performances such as the processability tend to be deteriorated.

<Low-Temperature Properties>

The polyurethane of the present embodiment has favorable low-temperature properties. The low-temperature properties in the present description can be evaluated based on the tensile elongation at break, Young's modulus, and 100% modulus in a tensile test at a low temperature of, for example, −10° C. More specifically, the "low-temperature properties" means flexibility, impact resistance, bending resistance, and durability at low temperature.

<Uses>

Since the polyurethane of the present embodiment has excellent chemical resistance as well as favorable flexibility, heat resistance, and weatherability, it can be widely used for, for example, foams, elastomers, elastic fibers, paints, fibers, tacky agents, adhesives, floor materials, sealants, medical materials, artificial leathers, synthetic leathers, coating agents, aqueous polyurethane paints, and active energy ray-curable polymer compositions.

In particular, since the polyurethane of the present embodiment has a favorable balance of chemical resistance, flexibility, heat resistance, and weatherability, when it is used for an artificial leather, synthetic leather, aqueous polyurethane, adhesive, elastic fiber, medical material, floor material, paint, coating agent, or the like, it can give favorable properties such as high durability, sufficient flexibility, and high physical impact resistance to portions which are to be in contact with human skin or to which a cosmetic agent or alcohol for disinfection is applied. The polyurethane of the present embodiment can also be favorably used for automotive uses requiring heat resistance, and outdoor uses requiring weatherability.

The polyurethane of the present embodiment can be used for casting polyurethane elastomers. Specific examples of such uses include rolls such as mill rolls, paper making rolls, office equipment, and pretension rolls; solid tires and casters for forklifts, automotive vehicle newtram, trucks, carts, and the like; and industrial products such as conveyor belt idlers, guide rolls, pulleys, steel pipe linings, rubber screens for ore, gears, connection rings, liners, pump impellers, cyclone cones, and cyclone liners. It can also be used for belts for office automation equipment, paper feed rolls, copier cleaning blades, snowplows, toothed belts, surf rollers, and the like.

The polyurethane of the present embodiment can also be applied to uses as a thermoplastic elastomer. Examples of such uses include pneumatic equipment used in the fields of food and medicine, coating devices, analyzers, laboratory equipment, metering pumps, water processing apparatuses, tubes and hoses for industrial robots and the like, spiral tubes, and fire hoses. It can also be used as belts such as round belts, V-belts, and flat belts, to be used for various transmission mechanisms, spinning machines, packaging devices, printing machines, and the like. It can also be used for heel tops and shoe soles for footwear; equipment parts such as coupling, packing, pole joints, bushes, gear wheels, and rolls; sporting goods; leisure goods; watch belts; and the like. It can also be used for automotive parts such as oil stoppers, gear boxes, spacers, chassis parts, interior parts, and tire chain alternatives. It can also be used for films such as keyboard films and automotive films; curl cords; cable sheaths; bellows; conveyor belts; flexible containers; binders; synthetic leathers; depinning products; adhesives; and the like.

The polyurethane of the present embodiment is also applicable to uses as a solvent-based two-component paint for wood products such as musical instruments, Buddhist altars, furniture, decorated plywood, and sporting goods. The polyurethane of the present embodiment can also be used as a tar epoxy urethane for automotive repair.

The polyurethane of the present embodiment can be used as a component in moisture-curable one-component paints, blocked isocyanate-based solvent paints, alkyd resin paints, urethane-modified synthetic resin paints, UV-curable paints, aqueous urethane paints, and the like, and is applicable to, for example, paints for plastic bumpers; strippable paints; coating agents for magnetic tapes; overprint varnishes for floor tiles, floor materials, paper, woodgrain-printed films, and the like; varnishes for wood; coil coatings for high-level processing; coatings for protection of optical fibers; solder resists; topcoats for metal printing; basecoats for vapor deposition; and white coats for food cans.

The polyurethane of the present embodiment is also applicable to tacky agents and adhesives for food packaging, shoes, footwear, magnetic tape binders, facial tissues, wood, structural members, and the like, and can also be used as a component of adhesives for low temperature and hot melts.

The polyurethane of the present embodiment can be used as a binder for magnetic recording media, inks, castings, burnt bricks, graft materials, microcapsules, granular fertilizers, granular pesticides, polymer cement mortars, resin mortars, rubber chip binders, regenerated foams, glass fiber sizing, and the like.

The polyurethane of the present embodiment can be used as a component of fiber processing agents for shrink proofing, crease proofing, water repelling, and the like.

In cases where the polyurethane of the present embodiment is used as an elastic fiber, the method for processing the polyurethane into the fiber is not limited as long as spinning is possible by the method. For example, a melt spinning method in which the polyurethane of the present embodiment is once pelletized, and then melt, followed by direct spinning through a spinneret may be employed. In cases where the elastic fiber is obtained by melt spinning, the spinning temperature is preferably not more than 250° C., more preferably 200° C. to 235° C.

The polyurethane elastic fiber of the present embodiment may be used as it is as a bare fiber, or may be used a coated fiber after coating with another fiber. Examples of the other fiber include conventionally known fibers such as polyamide fibers, wool, cotton, and polyester fibers. Polyester fibers are especially preferably used. The polyurethane elastic fiber may contain a dyeing-type dispersed dye.

The polyurethane of the present embodiment can be used as a sealant/caulking for concrete walls, induction joints, sash-related members, wall-type PC (Precast Concrete) joints, ALC (Autoclaved Light-weight Concrete) joints, board joints, sealants for composite glasses, sealants for heat insulating sashes, sealants for automobiles, and the like.

The polyurethane of the present embodiment can be used as a medical material. For example, it can be used as a blood-compatible material for tubes, catheters, artificial hearts, artificial blood vessels, and prosthetic valves, and as a disposable material for catheters, tubes, bags, surgical gloves, artificial kidney potting materials, and the like.

The polyurethane of the present embodiment may be modified at its termini for use as materials for UV-curable paints; electron-beam-curable paints; photosensitive resin compositions for flexographic printing plates; light-curable optical fiber coating compositions; and the like.

<Urethane (Meth)Acrylate Oligomer>

Using the polyester polyol of the present embodiment, a urethane (meth)acrylate oligomer can be produced by addition reaction of polyisocyanate and hydroxyalkyl (meth)acrylate. In cases where a polyol, chain extender, and/or the like is/are used in combination as another/other material compound(s), the urethane (meth)acrylate oligomer can be produced by addition reaction of the polyisocyanate as well as the other material compound(s).

In the present description, the term "(meth)acryl" as in (meth)acrylate and (meth)acrylic acid means acryl and/or methacryl.

The feed ratio of each material compound in such cases is substantially equivalent to, or the same as, that in the composition of the urethane (meth)acrylate oligomer of interest.

The total amount of isocyanate groups in the urethane (meth)acrylate oligomer is usually theoretically equimolar to the total amount of functional groups that react with the isocyanate groups, such as hydroxyl groups and amino groups.

When the urethane (meth)acrylate oligomer is produced, the amount of the hydroxyalkyl (meth)acrylate used with respect to the total amount of the hydroxyalkyl (meth)acrylate, the polyester polyol, and the other material compound(s) used as required, that is, the polyol and/or a compound(s) containing a functional group that reacts with isocyanate such as a chain extender, is usually not less than 10 mol %, preferably not less than 15 mol %, still more preferably not less than 25 mol %, and is usually not more than 70 mol %, preferably not more than 50 mol %. Depending on this ratio, the molecular weight of the resulting urethane (meth)acrylate oligomer can be controlled. In cases where the ratio of the hydroxyalkyl (meth)acrylate is high, the molecular weight of the urethane (meth)acrylate oligomer tends to be low, while in cases where the ratio is low, the molecular weight tends to be high.

The amount of the polyester polyol used with respect to the total amount of the polyester polyol and the polyol is preferably not less than 25 mol %, more preferably not less than 50 mol %, still more preferably not less than 70 mol %. In cases where the amount of the polyester polyol used is not less than the lower limit, the resulting cured product tends to have favorable hardness and contamination resistance, which is preferred.

The amount of the polyester polyol used with respect to the total amount of the polyester polyol and the polyol is preferably not less than 10% by mass, more preferably not less than 30% by mass, still more preferably not less than 50% by mass, especially preferably not less than 70% by mass. In cases where the amount of the polyester polyol used is not less than the lower limit, the viscosity of the resulting composition tends to low, so that the operability may be improved, and the mechanical strength and the hardness as well as the abrasion resistance of the resulting cured product tend to be improved, which is preferred.

The amount of the polyester polyol used with respect to the total amount of the polyester polyol and the polyol is preferably not less than 25 mol %, more preferably not less than 50 mol %, still more preferably not less than 70 mol %. In cases where the amount of the polyester polyol used is not less than the lower limit, the resulting cured product tends to have improved extensibility and weatherability, which is preferred.

In cases where a chain extender is used, the amount of the polyol used with respect to the total amount of compounds including the polyester polyol, polyol, and chain extender is preferably not less than 70 mol %, more preferably not less than 80 mol %, still more preferably not less than 90 mol %, especially preferably not less than 95 mol %. In cases where the amount of the polyol is not less than the lower limit, the liquid stability tends to be improved, which is preferred.

In the production of the urethane (meth)acrylate oligomer, a solvent may be used for the purpose of controlling the viscosity. A single kind of solvent, or a mixture of two or more kinds of solvents may be used. As the solvent, any of known solvents may be used. Preferred examples of the solvent include toluene, xylene, ethyl acetate, butyl acetate, cyclohexanone, methyl ethyl ketone, and methyl isobutyl ketone. The solvent may be usually used in an amount of less than 300 parts by mass with respect to 100 parts by mass of the solid content in the reaction system.

In the production of the urethane (meth)acrylate oligomer, the total content of the resulting urethane (meth)acrylate oligomer and the material compounds thereof is preferably not less than 20% by mass, more preferably not less than 40% by mass with respect to the total amount of the reaction system. The upper limit of the total content is 100% by mass. In cases where the total content of the urethane (meth)acrylate oligomer and the material compounds thereof is not less than 20% by mass, the reaction rate tends to be high, leading to an improved production efficiency, which is preferred.

In the production of the urethane (meth)acrylate oligomer, an addition reaction catalyst may be used. Examples of the addition reaction catalyst include dibutyltin laurate, dibutyltin dioctoate, dioctyltin dilaurate, and dioctyltin dioctoate. A single kind of addition reaction catalyst, or a mixture of two or more kinds of addition reaction catalysts may be used. Among these, the addition reaction catalyst is preferably dioctyltin dilaurate from the viewpoint of environment adaptability, catalytic activity, and shelf stability.

In terms of the content of the addition reaction catalyst used with respect to the total content of the resulting urethane (meth)acrylate oligomer and the material compounds thereof, the upper limit is usually 1000 ppm by weight, preferably 500 ppm by weight, and the lower limit is usually 10 ppm by weight, preferably 30 ppm by weight.

In the production of the urethane (meth)acrylate oligomer, a polymerization inhibitor may be used in combination in cases where the reaction system contains a (meth)acryloyl group. Examples of such a polymerization inhibitor include phenols such as hydroquinone, methylhydroquinone, hydroquinone monoethyl ether, and dibutylhydroxytoluene; amines such as phenothiazine and diphenylamine; copper salts such as copper dibutyldithiocarbamate; manganese salts such as manganese acetate; nitro compounds; and nitroso compounds. A single kind of polymerization inhibitor, or a mixture of two or more kinds of polymerization inhibitors may be used. Among these, the polymerization inhibitor is preferably a phenol.

In terms of the content of the polymerization inhibitor used with respect to the total content of the resulting urethane (meth)acrylate oligomer and the material compounds thereof, the upper limit is usually 3000 ppm, preferably 1000 ppm by weight, especially preferably 500 ppm by weight, and the lower limit is usually 50 ppm by weight, preferably 100 ppm by weight.

In the production of the urethane (meth)acrylate oligomer, the reaction temperature is usually not less than 20° C., preferably not less than 40° C., more preferably not less than 60° C. In cases where the reaction temperature is not less than 20° C., the reaction rate tends to be high, leading to an improved production efficiency, which is preferred. The reaction temperature is usually not more than 120° C., preferably not more than 100° C. In cases where the reaction temperature is not more than 120° C., side reactions such as allophanate-forming reaction are less likely to occur, which is preferred. In cases where the reaction system contains a solvent, the reaction temperature is preferably not more than the boiling point of the solvent. In cases where the reaction system contains (meth)acrylate, the reaction temperature is preferably not more than 70° C. from the viewpoint of preventing reaction of (meth)acryloyl groups. The reaction time is usually about 5 to 20 hours.

The number average molecular weight of the thus obtained urethane (meth)acrylate oligomer is preferably not less than 500, especially preferably not less than 1000, and is preferably not more than 10000, more preferably not more than 5000, especially preferably not more than 3000. In cases where the number average molecular weight of the urethane (meth)acrylate oligomer is not less than the lower limit, the resulting cured film has favorable three-dimensional processability, and tends to have an excellent balance of three-dimensional processability and contamination resistance, which is preferred. In cases where the number average molecular weight of the urethane (meth)acrylate oligomer is not more than the upper limit, the cured film obtained from the composition has favorable contamination resistance, and tends to have an excellent balance of three-dimensional processability and contamination resistance, which is preferred. This is assumed to be due to the fact that the three-dimensional processability and the contamination resistance are dependent on the distance between cross-linking points in the network structure, and that, as this distance increases, the structure becomes more flexible and extensible, providing excellent three-dimensional processability, while as the distance decreases, the network structure becomes stronger, providing excellent contamination resistance.

<Active Energy Ray-Curable Polymer Composition>

An active energy ray-curable polymer composition as an embodiment of the present invention containing the urethane (meth)acrylate oligomer is described below.

In the active energy ray-curable polymer composition of the present embodiment, the calculated molecular weight between network cross-linking points of the composition is preferably 500 to 10,000.

In the present description, the calculated molecular weight between network cross-linking points of a composition means the average molecular weight among the active energy ray-reactive groups forming the network structure (which may be hereinafter referred to as "cross-linking points") in the whole composition. The calculated molecular weight between network cross-linking points is correlated with the network area upon formation of the network structure. The higher the calculated molecular weight between network cross-linking points, the lower the cross-linking density. In the reaction of curing by an active energy ray, in cases of reaction of a compound having only one active energy ray-reactive group (which may be hereinafter referred to as "monofunctional compound"), a linear polymer is produced, while in cases of reaction of a compound having two or more active energy ray-reactive groups (which may be hereinafter referred to as "polyfunctional compound"), a network structure is formed.

Thus, here, the calculation of the calculated molecular weight between network cross-linking points is carried out based on the assumptions that the active energy ray-reactive groups contained in the polyfunctional compound are cross-linking points, that the polyfunctional compound having the cross-linking points acts as the center, and that the monofunctional compound has an effect to increase the molecular weight between the cross-linking points contained in the polyfunctional compound. The calculation of the calculated molecular weight between network cross-linking points is carried out based also on the assumption that all active energy ray-reactive groups have the same reactivity, and that all active energy ray-reactive groups undergo the reaction by irradiation with the active energy ray.

In cases of a single-system composition of polyfunctional compound in which only one kind of polyfunctional compound undergoes the reaction, the average molecular weight per active energy ray-reactive group contained in the polyfunctional compound is multiplied by two to obtain the calculated molecular weight between network cross-linking points. For example, in cases of a bifunctional compound having a molecular weight of 1000, the calculated molecular weight between network cross-linking points is calculated as $(1000/2) \times 2 = 1000$, and, in cases of a trifunctional compound having a molecular weight of 300, the calculated molecular weight between network cross-linking points is calculated as $(300/3) \times 2 = 200$.

In cases of a mixed-system composition of polyfunctional compounds in which a plurality of kinds of polyfunctional compounds undergo the reaction, the average of the calculated molecular weight between network cross-linking points for each single system described above for the total number of active energy ray-reactive groups contained in the composition is the calculated molecular weight between network cross-linking points of the composition. For example, in a composition composed of a mixture of 4 moles of a bifunctional compound having a molecular weight of 1000 and 4 moles of a trifunctional compound having a molecular weight of 300, the total number of active energy ray-reactive groups in the composition is $2 \times 4 + 3 \times 4 = 20$, and the calculated molecular weight between network cross-linking points of the composition is calculated as $\{(1000/2) \times 8 + (300/3) \times 12\} \times 2/20 = 520$.

In cases where the composition contains a monofunctional compound, and the calculation is carried out based on the assumption that the reaction occurs such that an equal number of moles of the monofunctional compound is linked to each active energy ray-reactive group (that is, cross-linking point) in the polyfunctional compound, and such that the monofunctional compound is positioned in the center of the molecular chain formed by the linking of the monofunctional compound to the cross-linking point, the amount of extension of the molecular chain by the monofunctional compound per cross-linking point is half the value calculated by dividing the total molecular weight of the monofunctional compound by the total number of active energy ray-reactive groups in the polyfunctional compound in the composition. Here, since the calculated molecular weight between network cross-linking points per cross-linking point is considered to be twice the average molecular weight, the amount of extension by the monofunctional compound for the calculated molecular weight between network cross-linking points calculated for the polyfunctional compound is the value calculated by dividing the total molecular weight of the monofunctional compound by the total number of active energy ray-reactive groups in the polyfunctional compound in the composition.

For example, since, in a composition composed of a mixture of 40 moles of a monofunctional compound having a molecular weight of 100 and 4 moles of a bifunctional compound having a molecular weight of 1,000, the number of active energy ray-reactive groups in the polyfunctional compound is calculated as $2 \times 4 = 8$, the amount of extension by the monofunctional compound in the calculated molecular weight between network cross-linking points is calculated as $100 \times 40/8 = 500$. That is, the calculated molecular weight between network cross-linking points of the composition is calculated as $1000 + 500 = 1500$. Thus, for a mixture of MA moles of a monofunctional compound having a molecular weight of WA, MB moles of an fB-functional compound having a molecular weight of WB, and MC moles of an fC-functional compound having a molecular weight of WC, the calculated molecular weight between network cross-linking points of the composition can be represented by the following equation.

$$\frac{\left(\frac{W_A M_A}{f_B M_B + f_C M_C} + \frac{2W_B}{f_B}\right) \times f_B M_B + \left(\frac{W_A M_A}{f_B M_B + f_C M_C} + \frac{2W_C}{f_C}\right) \times f_C M_C}{f_B M_B + f_C M_C} = \frac{W_A M_A + 2W_B M_B + 2W_C M_C}{f_B M_B + f_C M_C}$$

[Mathematical 1]

The calculated molecular weight between network cross-linking points of the active energy ray-curable polymer composition calculated as described above is preferably not less than 500, more preferably not less than 800, still more preferably not less than 1000, and is preferably not more than 10,000, more preferably not more than 8000, still more preferably not more than 6000, still more preferably not more than 4000, especially preferably not more than 3000.

In cases where the calculated molecular weight between network cross-linking points is not more than 10,000, the cured film obtained from the composition has favorable contamination resistance, and tends to have an excellent balance of three-dimensional processability and contamination resistance, which is preferred. In cases where the calculated molecular weight between network cross-linking points is not less than 500, the resulting cured film has favorable three-dimensional processability, and tends to have an excellent balance of three-dimensional processability and contamination resistance, which is preferred. This is assumed to be due to the fact that the three-dimensional processability and the contamination resistance are dependent on the distance between cross-linking points in the network structure, and that, as this distance increases, the structure becomes more flexible and extensible, providing excellent three-dimensional processability, while as the distance decreases, the network structure becomes stronger, providing excellent contamination resistance.

The active energy ray-curable polymer composition may further contain a component other than the urethane (meth) acrylate oligomer. Examples of such other component include active energy ray-reactive monomers, active energy ray-curable oligomers, polymerization initiators, photosensitizers, additives, and solvents.

In the active energy ray-curable polymer composition, the content of the urethane (meth)acrylate oligomer is preferably not less than 40% by mass, more preferably not less than 60% by mass, with respect to the total amount of the active energy ray-reactive component including the urethane (meth)acrylate oligomer. The upper limit of the content is 100% by mass. In cases where the content of the urethane (meth)acrylate oligomer is not less than 40% by mass, the composition has favorable curability, and the mechanical strength upon production of a cured product does not become too much, so that the three-dimensional processability tends to be improved, which is preferred.

In the active energy ray-curable polymer composition, the content of the urethane (meth)acrylate oligomer is preferably high from the viewpoint of the extensibility and the film-forming property, while the content is preferably low from the viewpoint of decreasing the viscosity. In view of this, the content of the urethane (meth)acrylate oligomer is preferably not less than 50% by mass, more preferably not less than 70% by mass, with respect to the total amount of all components including the active energy ray-reactive component as well as other components. The upper limit of the content of the urethane (meth)acrylate oligomer is 100% by mass. The content is preferably not more than this upper limit.

In the active energy ray-curable polymer composition, the total content of the active energy ray-reactive component including the urethane (meth)acrylate oligomer is preferably not less than 60% by mass, more preferably not less than 80% by mass, still more preferably not less than 90% by mass, especially preferably not less than 95% by mass, with respect to the total amount of the composition from the viewpoint of achieving an excellent cure rate and surface curability as the composition and prevention of residual tack. The upper limit of the content is 100% by mass.

As the active energy ray-reactive monomers, any known active energy ray-reactive monomers may be used. These active energy ray-reactive monomers are used for the purpose of controlling the hydrophilicity or hydrophobicity of the urethane (meth)acrylate oligomer, physical properties of the cured product obtained from the resulting composition such as the hardness and the extensibility, and/or the like. A single kind of active energy ray-reactive monomers, or a mixture of two or more kinds of active energy ray-reactive monomers may be used.

Examples of such active energy ray-reactive monomers include vinyl ethers, (meth)acrylamides, and (meth)acrylates. Specific examples of the active energy ray-reactive monomers include aromatic vinyl monomers such as styrene, α-methylstyrene, α-chlorostyrene, vinyltoluene, and divinylbenzene; vinyl ester monomers such as vinyl acetate, vinyl butyrate, N-vinylformamide, N-vinylacetamide, N-vinyl-2-pyrrolidone, N-vinylcaprolactam, and divinyl adipate; vinyl ethers such as ethyl vinyl ether and phenyl vinyl ether; allyl compounds such as diallyl phthalate, trimethylolpropane diallyl ether, and allyl glycidyl ether; (meth)acrylamides such as (meth)acrylamide, N,N-dimethylacrylamide, N,N-dimethylmethacrylamide, N-methylol(meth)acrylamide, N-methoxymethyl(meth)acrylamide, N-butoxymethyl (meth)acrylamide, N-t-butyl(meth)acrylamide, (meth)acryloylmorpholine, and methylenebis(meth)acrylamide; monofunctional (meth)acrylates such as (meth)acrylate, methyl (meth)acrylate, ethyl (meth)acrylate, propyl (meth) acrylate, n-butyl (meth)acrylate, i-butyl (meth)acrylate, t-butyl (meth)acrylate, hexyl (meth)acrylate, 2-ethylhexyl (meth)acrylate, lauryl (meth)acrylate, stearyl (meth)acrylate, tetrahydrofurfuryl (meth)acrylate, morpholyl (meth) acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, benzyl (meth)acrylate, cyclohexyl (meth)acrylate, phenoxyethyl (meth)acrylate, tricyclodecane (meth)acrylate, dicyclopentenyl (meth)acrylate, dicyclopentenyloxyethyl (meth)acrylate, dicyclopentanyl (meth)acrylate, allyl (meth)acrylate, 2-ethoxyethyl (meth) acrylate, isobornyl (meth)acrylate, and phenyl (meth)acrylate; and polyfunctional (meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate (n=5 to 14), propylene glycol di(meth)acrylate, dipropylene glycol di(meth)acrylate, tripropylene glycol di(meth)acrylate, tetrapropylene glycol di(meth)acrylate, polypropylene glycol di(meth)acrylate (n=5 to 14), 1,3-butylene glycol di(meth)acrylate, 1,4-butanediol di(meth)acrylate, polybutylene glycol di(meth)acrylate (n=3 to 16), poly(l-methyl butylene glycol) di(meth)acrylate (n=5 to 20), 1,6-hexanediol di(meth)acrylate, 1,9-nonanediol di(meth)acrylate, neopentyl glycol di(meth)acrylate, hydroxypivalic acid neopentyl glycol di(meth)acrylate, dicyclopentanediol di(meth)acrylate, tricyclodecane di(meth)acrylate, trimethylol propane tri(meth) acrylate, pentaerythritol tri(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, trimethylolpropane trioxyethyl (meth)acrylate, trimethylolpropane trioxypropyl (meth)acrylate, trimethylolpropane polyoxyethyl (meth)acrylate, trimethylolpropane polyoxypropyl (meth)acrylate, tris(2-hydroxyethyl)isocyanurate tri (meth)acrylate, tris(2-hydroxyethyl)isocyanurate di(meth)

acrylate, ethylene oxide adduct of bisphenol A di(meth) acrylate, ethylene oxide adduct of bisphenol F di(meth) acrylate, propylene oxide adduct of bisphenol A di(meth) acrylate, propylene oxide adduct of bisphenol F di(meth) acrylate, tricyclodecane dimethanol di(meth)acrylate, bisphenol A epoxy di(meth)acrylate, and bisphenol F epoxy di(meth)acrylate.

Among these, in uses requiring applicability, monofunctional (meth)acrylates having a ring structure in the molecule, such as (meth)acryloylmorpholine, tetrahydrofurfuryl (meth)acrylate, benzyl (meth)acrylate, cyclohexyl (meth) acrylate, trimethylcyclohexyl (meth)acrylate, phenoxyethyl (meth)acrylate, tricyclodecane (meth)acrylate, dicyclopentenyl (meth)acrylate, isobornyl (meth)acrylate, and (meth) acrylamide are especially preferred. On the other hand, in uses requiring mechanical strength of the resulting cured product, polyfunctional (meth)acrylates such as 1,4-butanediol di(meth)acrylate, 1,6-hexanediol di(meth)acrylate, 1,9-nonanediol di(meth)acrylate, neopentyl glycol di(meth) acrylate, tricyclodecane di(meth)acrylate, trimethylolpropane tri(meth)acrylate, pentaerythritol tri (meth)acrylate, pentaerythritol tetra(meth)acrylate, dipentaerythritol tetra(meth)acrylate, dipentaerythritol penta(meth)acrylate, and dipentaerythritol hexa(meth)acrylate are preferred.

In the active energy ray-curable polymer composition, the content of the active energy ray-reactive monomers is preferably not more than 50% by mass, more preferably not more than 30% by mass, still more preferably not more than 20% by mass, especially preferably not more than 10% by mass, with respect to the total amount of the composition from the viewpoint of controlling the viscosity of the composition and controlling physical properties such as the hardness and the extensibility of the resulting cured product.

A single kind of active energy ray-curable oligomer, or a mixture of two or more kinds of active energy ray-curable oligomers described above may be used. Examples of the active energy ray-curable oligomer include epoxy (meth) acrylate oligomers and acryl (meth)acrylate oligomers.

In the active energy ray-curable polymer composition, the content of the active energy ray-reactive oligomer is preferably not more than 50% by mass, more preferably not more than 30% by mass, still more preferably not more than 20% by mass, especially preferably not more than 10% by mass, with respect to the total amount of the composition from the viewpoint of controlling physical properties such as the hardness, extensibility, and the like of the resulting cured product.

The polymerization initiator is used mainly for the purpose of, for example, improving the initiation efficiency of the polymerization reaction that proceeds by irradiation with an active energy ray such as ultraviolet rays or electron beam. The polymerization initiator is commonly a photo-radical polymerization initiator, which is a compound having the property of generating radicals upon irradiation with light. Any known photo-radical polymerization initiator may be used as the polymerization initiator. A single kind of polymerization initiator, or a mixture of two or more kinds of polymerization initiators may be used. A photo-radical polymerization initiator(s) and a photosensitizer(s) may be used in combination.

Examples of the photo-radical polymerization initiator include benzophenone, 2,4,6-trimethylbenzophenone, 4,4-bis(diethylamino)benzophenone, 4-phenylbenzophenone, methyl orthobenzoylbenzoate, thioxanthone, diethylthioxanthone, isopropylthioxanthone, chlorothioxanthone, 2-ethylanthraquinone, t-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methyl benzoylformate, 2-methyl-1-{4-(methylthio)phenyl}-2-morpholinopropan-1-one, 2,6-dimethylbenzoyldiphenylphosphine oxide, 2,4,6-trimethylbenzoyldiphenylphosphine oxide, bis(2,6-dimethoxybenzoyl)-2,4,4-trimethylpentylphosphine oxide, bis(2, 4,6-trimethylbenzoyl)phenylphosphine oxide, and 2-hydroxy-1-{4-[4-(2-hydroxy-2-methyl-propionyl)-benzyl]-phenyl}-2-methyl-propan-1-one.

Among these, from the viewpoint of achieving a high cure rate and a sufficiently high cross-linking density, benzophenone, 2-hydroxy-2-methyl-1-phenylpropan-1-one, 1-hydroxycyclohexyl phenyl ketone, 2,4,6-trimethylbenzoyldiphenylphosphine oxide, and 2-hydroxy-1-{4-[4-(2-hydroxy-2-methyl-propionyl)-benzyl]-phenyl}-2-methyl-propan-1-one are preferred. 1-Hydroxycyclohexyl phenyl ketone, 2,4, 6-trimethylbenzoyldiphenylphosphine oxide, and 2-hydroxy-1-{4-[4-(2-hydroxy-2-methyl-propionyl)-benzyl]-phenyl}-2-methyl-propan-1-one are more preferred.

In cases where the active energy ray-curable polymer composition contains a compound having a cationically polymerizable group such as an epoxy group as well as a radically polymerizable group, a photo-cationic polymerization initiator may be contained together with the photo-radical polymerization initiator described above. Any known photo-cationic polymerization initiator may be used as the polymerization initiator.

In the active energy ray-curable polymer composition, the content of these polymerization initiators is preferably not more than 10 parts by mass, more preferably not more than 5 parts by mass, with respect to 100 parts by mass of the total of the active energy ray-reactive component. In cases where the content of the polymerization initiator is not more than 10 parts by mass, a decrease in the mechanical strength due to a degradation product of the initiator is less likely to occur, which is preferred.

The photosensitizer may be used for the same purpose as the polymerization initiator. A single kind of photosensitizer, or a mixture of two or more kinds of photosensitizers may be used. As the photosensitizer, any known photosensitizer may be used as long as the effect of the present invention can be obtained. Examples of such a photosensitizer include ethanolamine, diethanolamine, triethanolamine, N-methyldiethanolamine, methyl 4-dimethylaminobenzoate, ethyl 4-dimethylaminobenzoate, amyl 4-dimethylaminobenzoate, and 4-dimethylaminoacetophenone.

In the active energy ray-curable polymer composition, the content of the photosensitizer is preferably not more than 10 parts by mass, more preferably not more than 5 parts by mass, with respect to 100 parts by mass of the total of the active energy ray-reactive component. In cases where the content of the photosensitizer is not more than 10 parts by mass, a decrease in the mechanical strength due to a decreased cross-linking density is less likely to occur, which is preferred.

The additives may be arbitrarily selected. Various materials that are added to compositions for similar uses may be used as the additives. A single kind of additive, or a mixture of two or more kinds of additives may be used. Examples of the additives include fillers such as glass fibers, glass beads, silica, alumina, calcium carbonate, mica, zinc oxide, titanium oxide, mica, talc, kaolin, metal oxides, metal fibers, iron, lead, and metal powders; carbon materials such as carbon fibers, carbon black, graphite, carbon nanotubes, and C60 fullerenes (the fillers and the carbon materials may be collectively referred to as "inorganic component"); modifiers such as antioxidants, heat stabilizers, UV absorbers, HALS (hindered amine light stabilizers), anti-fingerprint agents, surface-hydrophilizing agents, antistatic agents, lubricating agents, plasticizers, mold release agents, antifoaming agents, leveling agents, antisettling agents, surfactants, thixotropy imparting agents, lubricants, flame retardants, flame-retardant aids, polymerization inhibitors, fillers, and silane coupling agents; coloring agents such as pigments, dyes, and color tone adjusters; and curing agents, catalysts, and curing accelerators that are necessary for synthesis of monomers and/or oligomer(s) thereof, and/or an inorganic component(s).

In the active energy ray-curable polymer composition, the content of the additive(s) is preferably not more than 10 parts by mass, more preferably not more than 5 parts by mass, with respect to 100 parts by mass of the total of the active energy ray-reactive component. In cases where the content of the additive(s) is not more than 10 parts by mass, a decrease in the mechanical strength caused by a decreased cross-linking density is less likely to occur, which is preferred.

The solvent may be used for the purpose of controlling the viscosity of the active energy ray-curable polymer composition depending on, for example, the coating method for formation of a coating of the active energy ray-curable polymer composition. A single kind of solvent, or a mixture of two or more kinds of solvents may be used. As the solvent, any known solvent may be used as long as the effect of the present invention can be obtained. Preferred examples of the solvent include toluene, xylene, ethyl acetate, butyl acetate, isopropanol, isobutanol, cyclohexanone, methyl ethyl ketone, and methyl isobutyl ketone. Normally, the solvent may be used in an amount of less than 200 parts by mass with respect to 100 parts by mass of the solid content in the active energy ray-curable polymer composition.

The method for including an arbitrary component(s) such as the additive(s) in the active energy ray-curable polymer composition is not limited, and examples of the method include conventionally known mixing methods and dispersing methods. For more secure dispersion of the arbitrary component(s), dispersion treatment using a disperser is preferably carried out. Specific examples of the method include treatment using, for example, a twin roll, triple roll, bead mill, ball mill, sand mill, pebble mill, trommel, sand grinder, Szegvari attritor, planetary stirrer, high-speed impeller disperser, high-speed stone mill, high-speed impact mill, kneader, homogenizer, or ultrasonic disperser.

The viscosity of the active energy ray-curable polymer composition can be adjusted, if necessary, depending on the use, mode of use, and/or the like of the composition. From the viewpoint of ease of handling, applicability, moldability, three-dimensional formability, and the like, the viscosity as measured with an E-type viscometer (rotor, 1° 34'×R24) at 25° C. is preferably not less than 10 mPa·s, more preferably not less than 100 mPa·s, and is preferably not more than 100,000 mPa·s, more preferably not more than 50,000 mPa·s. The viscosity of the active energy ray-curable polymer composition can be adjusted by the content of the urethane (meth)acrylate oligomer, the type(s) and/or the mixing ratio(s) of the arbitrary component(s), and/or the like.

Examples of the application method for the active energy ray-curable polymer composition include known methods such as the bar coater method, applicator method, curtain flow coater method, roll coater method, spray method, gravure coater method, comma coater method, reverse roll coater method, lip coater method, die coater method, slot die coater method, air knife coater method, and dip coater method. Among these, the bar coater method and the gravure coater method are preferred.

<Cured Film and Laminate>

The active energy ray-curable polymer composition of the present embodiment can be made into a cured film by radiation of an active energy ray thereto.

As the active energy ray for the curing of the composition, infrared rays, visible lights, ultraviolet rays, X-rays, electron beams, α-rays, β-rays, γ-rays, and the like may be used. From the viewpoint of the cost for the apparatus, and the productivity, it is preferred to use electron beams or ultraviolet rays. An electron beam irradiator, ultra-high pressure mercury lamp, high-pressure mercury lamp, medium-pressure mercury lamp, low-pressure mercury lamp, metal halide lamp, Ar laser, He—Cd laser, solid laser, xenon lamp, high-frequency induction mercury lamp, sunlight, or the like may be suitably used as the light source.

The irradiation dose of the active energy ray may be appropriately selected depending on the type of the active energy ray. For example, in cases where the curing is carried out by irradiation with electron beams, the irradiation dose is preferably 1 to 10 Mrad. In cases of ultraviolet irradiation, the irradiation dose is preferably 50 to 1000 mJ/cm$^2$. The atmosphere for the curing may be air, nitrogen, or an inert gas such as argon. The irradiation may be carried out in a closed space between a film or glass and a metal mold.

The film thickness of the cured film may be appropriately set depending on the use of interest. The lower limit of the film thickness is preferably 1 μm, more preferably 3 μm, especially preferably 5 μm. The upper limit of the film thickness is preferably 200 μm, more preferably 100 μm, especially preferably 50 μm. In cases where the film thickness is not less than 1 μm, favorable design and functionality can be achieved after the three-dimensional processing, and, in cases where the film thickness is not more than 200 μm, favorable internal curability and three-dimensional processability can be achieved, which is preferred. In industrial uses, the lower limit of the film thickness of the cured film is preferably 1 μm, and the upper limit is preferably 100 μm, more preferably 50 μm, especially preferably 20 μm, most preferably 10 μm.

A laminate having a layer composed of the cured film on a base material can be obtained.

The laminate is not limited as long as it has the layer composed of the cured film. The laminate may have a layer other than the base material and the cured film between the base material and the cured film, or may have such a layer outside thereof. The laminate may have a plurality of layers of the base material and/or the cured film.

As the method for obtaining the laminate having a plurality of layers of the cured film, a known method such as a method in which all layers are laminated with each other in an uncured state, and then curing is performed with an active energy ray, a method in which a lower layer(s) is cured or semi-cured with an active energy ray, and then an upper layer(s) is/are applied, followed by further performing curing with an active energy ray, or a method in which each layer is applied to a mold release film or a base film, and the layers are then attached to each other in an uncured or semi-cured state, may be applied. From the viewpoint of increasing adhesion between the layers, the method in which the layers are laminated with each other in an uncured state, and then curing is performed with an active energy ray, is preferred. As the method for laminating the layers in an uncured state, a known method such as sequential application in which a lower layer(s) is/are applied and then an upper layer(s) is/are applied thereon, or simultaneous multilayer application in which layering and application of two or more layers are carried out at once from a multislit, may be applied, but the method is not limited to these.

Examples of the base material include products having various shapes, for example, polyesters such as polyethylene terephthalate and polybutylene terephthalate; polyolefins such as polypropylene and polyethylene; various plastics such as polyolefin, nylon, polycarbonate, and (meth)acrylic resin; and plates formed with metals.

The cured film can be made as a film having excellent contamination resistance against general household contaminants such as inks and ethanol, and having hardness. Laminates prepared by coating various base materials with the cured film can have excellent design and surface protection.

By taking into account the calculated molecular weight between network cross-linking points, the active energy ray-curable polymer composition of the present embodiment can provide a cured film having flexibility that allows the cured film to follow deformation during three-dimensional processing, and having sufficient elongation at break, mechanical strength, contamination resistance, and hardness at the same time.

The active energy ray-curable polymer composition of the present embodiment is expected to enable simple production of a film-shaped resin sheet by single-layer application.

The value of the elongation at break of the cured film, as measured by cutting the cured film into a piece having a width of 10 mm and performing a tensile test using a Tensilon tensile tester (manufactured by Orientec, Tensilon UTM-III-100) at a temperature of 23° C. with a pulling rate of 50 mm/minute and a chuck distance of 50 mm, is preferably not less than 50%, more preferably not less than 75%, still more preferably not less than 100%, especially preferably not less than 120%.

The cured film or the laminate can be used as a paint-substituting film. For example, they are effectively applicable to interior and exterior building decorative materials; and various members for automobiles and home electric appliances.

EXAMPLES

[Evaluation Method: 1,10-Decanediol]
<Quantification of Aldehyde Body Content in 1,10-Decanediol>

In $CD_3CN$, 1,10-decanediol (which may be hereinafter simply referred to as 1,10DD) was dissolved, and measurement by $^1H$-NMR (manufactured by Bruker, 400 MHz NMR AVANCE 400) was carried out. Based on the signal position for each component, aldehyde groups were identified, and the aldehyde body content was calculated from the integrated value. The aldehyde body content was calculated for aldehyde body in terms of 1-hydroxy-10-decanal. The lower limit of the aldehyde body content with respect to the total weight of the sample is 0.01% by weight.

[Evaluation Method: Polyester Polyol]
<Acid Value Measurement>

The acid value of the polyester polyol was measured according to JIS K1557-5 (2007).

<Hydroxyl Value Measurement and Number Average Molecular Weight>

The hydroxyl value of the polyester polyol was measured according to JIS K1557-1 (2007). The number average molecular weight of the polyester polyol was calculated from the measured hydroxyl value according to the following equation.

$$\text{Number average molecular weight} = 2 \times 56.1 \times 1000 / \text{hydroxyl value}$$

<Quantification of Contents of Aldehyde Groups (Aldehyde Bodies) and Acetal Groups in Polyester Polyol>

The contents of aldehyde groups and acetal groups in the polyester polyol are amounts calculated by $^1H$-NMR. That is, the polyester polyol was dissolved in $CDCl_3$, and measurement by $^1H$-NMR (manufactured by Bruker, 400 MHz NMR AVANCE 400) was carried out. Based on the signal position for each component, aldehyde groups were identified, and the aldehyde body content was calculated from the integrated value. The aldehyde body content was calculated for aldehyde body in terms of 1-hydroxy-10-decanal. The lower limit of the aldehyde body content with respect to the total weight of the sample is 0.01% by weight.

[Evaluation Method: Polyurethane]
<Measurement of Concentration of Isocyanate Groups>

With 90 mL of acetone, 20 mL of a mixed solution of di-n-butylamine/toluene (weight ratio, 2/25) was diluted, and titration was carried out with 0.5 N aqueous hydrochloric acid solution. The amount of the aqueous hydrochloric acid solution required for neutralization was measured to provide the blank value. Subsequently, 1 to 2 g of the reaction solution was taken, and 20 mL of a mixed solution of di-n-butylamine/toluene was added thereto, followed by stirring the resulting mixture at room temperature for 30 minutes. In the same manner as in the blank measurement, the mixture was then diluted with 90 mL of acetone, and titration was carried out with 0.5 N aqueous hydrochloric acid solution. The amount of the aqueous hydrochloric acid solution required for neutralization was measured to quantify the amount of residual amine. Based on the amount of the aqueous hydrochloric acid solution required for the neutralization, the concentration of isocyanate groups was calculated according to the following equation.

$$\text{Concentration of isocyanate groups (\% by weight)} = A \times 42.02 / D$$

A: Isocyanate groups contained in the sample used for the main measurement (mol)

$$A = (B - C) \times 0.5 / 1000 \times f$$

B: Amount of 0.5 N aqueous hydrochloric acid solution required for the blank measurement (mL)
C: Amount of 0.5 N aqueous hydrochloric acid solution required for the main measurement (mL)
f: Titer of the aqueous hydrochloric acid solution
D: Sample used for the main measurement (g)

<Aldehyde Groups and Acetal Groups>

The contents of aldehyde groups and acetal groups in the polyurethane are amounts calculated by $^1H$-NMR.

<Measurement of Solution Viscosity>

With a VISCOMETER TV-22 (manufactured by Toki Sangyo Co., Ltd.) equipped with a 3°×R14 rotor, a solution of polyurethane in dimethylformamide (concentration, 30% by weight) was used to measure the solution viscosity of the polyurethane solution at 25° C.

<Method for Tensile Test at Room Temperature>

According to JIS K6301 (2010), a strip-shaped polyurethane test piece having a width of 10 mm, length of 100 mm, and thickness of about 50 µm was subjected to a tensile test using a tensile tester (manufactured by Orientec; trade name, "Tensilon UTM-III-100") with a chuck distance of 50 mm and a pulling rate of 500 mm/minute at a temperature of 23°

C. (relative humidity, 55%). The stresses at the time points when the test piece was elongated to 100%, 300%, and the breaking point were measured.

<Molecular Weight Measurement>

In measurement of the molecular weight of the polyurethane, a dimethylacetamide solution was prepared such that the concentration of the polyurethane was 0.14% by weight, and a GPC device (manufactured by Tosoh Corporation; trade name, "HLC-8220" (column: 2×Tskgel GMH-XL)) was used to measure the number average molecular weight (Mn) and the weight average molecular weight (Mw) in terms of standard polystyrene.

<Method for Evaluation of Oleic Acid Resistance of Polyurethane>

A polyurethane solution was applied onto a fluorine resin sheet (fluorine tape NITOFLON 900; thickness, 0.1 mm; manufactured by Nitto Denko Corporation) using a 9.5-mil applicator, and the resulting sheet was dried at 60° C. for 1 hour and then at 100° C. for 0.5 hour. Further drying was carried out at 100° C. under vacuum for 0.5 hour, and then at 80° C. for 15 hours. The sheet was then left to stand at a constant temperature of 23° C. and a constant humidity of 55% RH for not less than 12 hours. From the resulting film, a test piece with a size of 3 cm×3 cm was cut out. The test piece was then placed in a 250-ml glass bottle containing 50 ml of a test solvent, and the bottle was left to stand in an incubator at 80° C. under nitrogen atmosphere for 4 hours. After the test, both sides of the test piece were gently wiped with a paper wiper, and weight measurement was carried out to calculate the ratio of weight increase relative to the weight before the test. The closer the weight change ratio to 0%, the better the oleic acid resistance.

<Method for Evaluation of Ethanol Resistance of Polyurethane>

By the same method as shown above in <Method for Evaluation of Oleic Acid Resistance of Polyurethane>, a urethane film was prepared. A piece with a size of 3 cm×3 cm was cut out to provide a test piece for the urethane film. After measuring the weight of the test piece using a precision balance, the test piece was placed in a glass petri dish having an inner diameter of 10 cmϕ containing 50 ml of a test solvent. The test piece was then kept immersed at a room temperature of about 23° C. for 1 hour. After the test, the test piece was removed and gently wiped with a paper wiper. Thereafter, weight measurement was carried out to calculate the ratio of weight increase relative to the weight before the test. The closer the weight change ratio to 0%, the better the ethanol resistance.

<Method for Evaluation of Ethyl Acetate Resistance of Polyurethane>

By the same method as described above in <Method for Evaluation of Oleic Acid Resistance of Polyurethane>, a urethane film was prepared. A piece with a size of 3 cm×3 cm was cut out to provide a test piece for the urethane film. After measuring the weight of the test piece using a precision balance, the test piece was placed in a glass petri dish having an inner diameter of 10 cmϕ containing 50 ml of ethyl acetate as a test solvent. The test piece was kept immersed at a room temperature of about 23° C. for 20 minutes. After the test, the test piece was removed and gently wiped with a paper wiper. Thereafter, weight measurement was carried out using a precision balance to calculate the weight change ratio (rate of increase) relative to the weight before the test. The closer the weight change ratio to 0%, the better the ethyl acetate resistance.

Synthesis Example 1

<Preparation of Aldehyde-Body-Containing 1,10DD>

In a 500-mL glass four-necked flask equipped with a thermometer, 318 g of 1,10DD containing 0.02% by weight aldehyde body (in terms of 1-hydroxy-10-decanal) was placed, and heated at 120° C. for 8 hours with air bubbling at 90 to 100 mL/min. to cause oxidation of part of the 1,10DD, thereby controlling the aldehyde body content in the 1,10DD. The aldehyde body content in the 1,10DD after the heating was 0.28% by weight in terms of 1-hydroxy-10-decanal.

Synthesis Example 2

In a 1-L glass four-necked flask equipped with a thermometer, 200 g of 1,10DD containing 0.02% by weight aldehyde body, 1.8 g of 2,2,6,6-tetramethylpiperidine-1-oxyl (TEMPO), and 600 mL of ethyl acetate were placed, and the resulting mixture was dissolved by heating at 50° C. for 1 hour. To the resulting solution, 230 mL of an aqueous sodium hypochlorite solution (5% by weight) was added, and the resulting mixture was heated at 50° C. for 3 hours. Thereafter, from the reaction liquid, which had two separate layers, the aqueous layer was removed, and the obtained organic layer was washed five times using 300 mL of water. The organic layer was then cooled to 0° C., and precipitated aldehyde-body-containing 1,10DD was collected by filtration, followed by vacuum drying of the precipitate at 50° C. The aldehyde body content in the obtained 1,10DD was 15% by weight in terms of 1-hydroxy-10-decanal.

In a 1-L glass four-necked flask equipped with a thermometer, 343.0 g of 1,10DD containing 0.02% by weight aldehyde body and 20.0 g of 1,10DD containing 15% by weight aldehyde body were heated at 120° C. and mixed together. The aldehyde body content in the obtained 1,10DD was 1.4% by weight.

Example 1

<Production of Polyester Polyol>

In a 1-L jacketed glass separable flask equipped with a stirrer, distillate trap, and pressure control unit, 74.5 g of succinic acid and 126.8 g of 1,10DD containing 0.02% by weight aldehyde body were placed as materials, and the atmosphere was replaced with nitrogen. The content was dissolved under heat, and the internal temperature was increased to 150° C. with stirring. Thereafter, the temperature was increased to 200° C. for 1 hour, and esterification was carried out at 200° C. for about 30 minutes while water was evaporated. Subsequently, the pressure was decreased to 390 hPa for about 30 minutes, and then kept for 1 hour until no distillation occurred. The pressure was then recovered with nitrogen, and 0.85 g of a Ti catalyst solution (Ti concentration, 0.1% by weight) prepared by the method described in JP 5176415 B was added. The pressure was decreased from atmospheric pressure to 19 hPa for about 30 minutes, and the pressure was then kept for 2 hours, followed by heating at 17 hPa for 30 minutes to perform transesterification reaction, thereby obtaining a polyester polyol. The obtained polyester polyol contained 0.05% by weight aldehyde body, and acetal groups were detected by $^1$H-NMR. Evaluation results on characteristics and physical properties of this polyester polyol are shown in Table 1.

Example 2

A polyester polyol was obtained by the same method as in Example 1 except that transesterification reaction was carried out at not more than 1 hPa for 2 hours using 186.3 g of succinic acid, 318.1 g of 1,10DD containing 0.28% by weight aldehyde body in Synthesis Example 1, and 0.071 g of a Ti catalyst solution (Ti concentration, 3.5% by weight) prepared by the method described in JP 5176415 B. The obtained polyester polyol contained 0.37% by weight aldehyde body, and acetal groups were detected by $^1$H-NMR. Evaluation results on characteristics and physical properties of this polyester polyol are shown in Table 1.

Example 3

In a 5-L jacketed glass separable flask equipped with a stirrer, distillate trap, and pressure control unit, 1490.7 g of succinic acid derived from a biomass resource and 2509.1 g of 1,10DD containing 0.02% by weight aldehyde body were placed as materials, and the atmosphere was replaced with nitrogen. The content was dissolved under heat, and the internal temperature was increased to 150° C. with stirring. Thereafter, the temperature was increased to 200° C. for 1 hour, and esterification was carried out at 200° C. for about 1 hour while water was evaporated. Subsequently, the pressure was decreased to 390 hPa for about 30 minutes, and then kept for 1 hour until no distillation occurred. The pressure was then recovered with nitrogen, and 0.52 g of a Ti catalyst solution (Ti concentration, 3.5% by weight) prepared by the method described in JP 5176415 B was added. The pressure was decreased from atmospheric pressure to 30 hPa for about 2 hours, and the pressure was then kept for 1 hour, followed by further reducing the pressure to 3 hPa and allowing the reaction to proceed for 8 hours, thereby obtaining a polyester polyol. The obtained polyester polyol contained 0.05% by weight aldehyde body, and acetal groups were detected by 1H-NMR. Evaluation results on characteristics and physical properties of this polyester polyol are shown in Table 1.

Example 4

A polyester polyol was obtained by the same method as in Example 2 using 110.1 g of succinic acid, 188.6 g of sebacic acid, 189.9 g of 1,10DD containing 0.02% by weight aldehyde body, 98.2 g of 1,4-butanediol, and 0.076 g of a Ti catalyst solution (Ti concentration, 3.5% by weight). The obtained polyester polyol contained 0.04% by weight aldehyde body, and acetal groups were detected by $^1$H-NMR. Evaluation results on characteristics and physical properties of this polyester polyol are shown in Table 1.

Reference Example 1

A polyester polyol was obtained by the same method as in Example 1 except that transesterification reaction was carried out at 10 hPa for 4 hours and then at not more than 1 hPa for 2 hours using 113.7 g of succinic acid, 192.9 g of highly purified, aldehyde-body-free commercially available 1,10DD, and 1.32 g of a Ti catalyst solution (Ti concentration, 0.1% by weight) prepared by the method described in JP 5176415 B. Evaluation results on characteristics and physical properties of this polyester polyol are shown in Table 1.

Comparative Example 1

A polyester polyol was obtained by the same method as in Example 2 using 335.8 g of succinic acid, 563.2 g of 1,10DD containing 0.02% by weight aldehyde body, and 0.112 g of a Ti catalyst solution (Ti concentration, 3.5% by weight). In a 1-L glass four-necked flask, 400 g of the obtained polyester polyol, 400 ML of THF, and 0.5 g of NaBH4 were placed, and the resulting mixture was heated at 50° C. for 3 h. The resulting reaction liquid was cooled to 20° C., and then 600 mL of water was added thereto. The precipitated polyester polyol was collected by filtration, and then dried at 50° C. The obtained polyester polyol was analyzed by $^1$H-NMR, but no aldehyde body could be detected. Evaluation results on characteristics and physical properties of this polyester polyol are shown in Table 1.

Comparative Example 2

A polyester polyol was obtained by the same method as in Example 2 using 212 g of succinic acid, 363 g of 1,10DD containing 1.4% by weight aldehyde body in Synthesis Example 2, and 0.076 g of a Ti catalyst solution (Ti concentration, 3.5% by weight). The obtained polyester polyol contained 0.59% by weight aldehyde body, and acetal groups were detected by $^1$H-NMR. Evaluation results on characteristics and physical properties of this polyester polyol are shown in Table 1.

TABLE 1

|  |  | Example 1 | Example 2 | Example 3 | Example 4 | Reference Example 1 | Comparative Example 1 | Comparative Example 2 |
| --- | --- | --- | --- | --- | --- | --- | --- | --- |
| 1,10DD | g | 126.8 | 318.1 | 2509.1 | 189.9 | 192.9 | 563.2 | 363.0 |
| Aldehyde body content in 1,10DD | wt % | 0.02 | 0.28 | 0.02 | 0.02 | 0.00 | 0.02 | 1.4 |
| 1,4-Butanediol | g | — | — | — | 98.2 | — | — | — |
| Succinic acid | g | 74.5 | 186.28 | 1409.7 | 110.1 | 113.69 | 335.8 | 212.0 |
| Sebacic acid | g | — | — | — | 188.6 | — | — | — |
| Ti concentration upon feeding | wt ppm | 4.2 | 4.9 | 4.5 | 4.5 | 4.3 | 4.4 | 4.6 |
| Final reaction temperature | ° C. | 200 | 200 | 200 | 200 | 200 | 200 | 4.4 |
| Final degree of pressure reduction | hPa | 17 | ≤1 | 3 | ≤1 | ≤1 | ≤1 | ≤1 |

TABLE 1-continued

|  | | Example 1 | Example 2 | Example 3 | Example 4 | Reference Example 1 | Comparative Example 1 | Comparative Example 2 |
|---|---|---|---|---|---|---|---|---|
| External appearance | | White solid | White solid | White solid | White solid | White solid | White solid | Yellow solid |
| Hydroxyl value | mg KOH/g | 56.8 | 51.7 | 55.2 | 46.3 | 57.7 | 53.6 | 60.3 |
| Number average molecular weight | | 1975 | 2170 | 2033 | 2423 | 2170 | 2093 | 1861 |
| Acid value | mg KOH/g | 0.06 | 0.82 | 0.05 | 0.02 | 0.15 | 0.02 | 0.03 |

As is evident from the table, it was found that, in cases where the aldehyde body content in the 1,10DD or the aldehyde body content in the polyester polyol is high, the produced polyester polyol has an unfavorable color tone because of its yellowish external appearance.

Example 5

Using the polyester polyol produced in Example 1, a particular polyurethane was produced by the following operation.

In a separable flask equipped with a thermocouple, 77 g of polyester polyol, 3.6 g of 1,4-butanediol (manufactured by Mitsubishi Chemical Corporation), 233 g of dehydrated N,N-dimethylformamide (hereinafter referred to as DMF, manufactured by Wako Pure Chemical Industries, Ltd.), and 18 mg of a urethanization catalyst (manufactured by Nitto Kasei Co., Ltd.; NEOSTANN U-830) that were preliminarily warmed to 100° C. were placed, and the flask was immersed in an oil bath whose temperature was set to 55° C. While the inside of the flask was warmed under nitrogen atmosphere, the mixture was stirred at 60 rpm for about 1 hour. After dissolution of the polyester polyol in the solvent, 19 g of 4,4'-diphenylmethane diisocyanate (hereinafter referred to as MDI, manufactured by Nippon Polyurethane Industry Co., Ltd.) was added to the resulting solution, and, when the increase in the internal temperature due to heat of reaction stopped and the temperature began to decrease, the oil bath was set to increase the temperature to 70° C., followed by stirring the mixture for 1 hour.

Thereafter, 0.68 g of MDI (MDI for divided addition) was dividedly added to obtain a solution of polyurethane having a weight average molecular weight of 131,000. From the obtained polyurethane, aldehyde body and acetal groups were detected by $^1$H-NMR. Evaluation results on characteristics and physical properties of this polyurethane are shown in Table 2.

Example 6

Using the polyester polyol produced in Example 2, a particular polyurethane was produced by the following operation.

Polymerization was carried out in the same manner as in Example 1 except that 85 g of polyester polyol produced in Example 2, 4.1 g of 1,4-butanediol, 261 g of DMF, 21 mg of a urethanization catalyst, 20 g of MDI, and 1.8 g MDI for divided addition were used, to obtain a polyurethane solution having a weight average molecular weight of 200,000. From the obtained polyurethane, aldehyde body and acetal groups were detected by $^1$H-NMR. Evaluation results on characteristics and physical properties of this polyurethane are shown in Table 2.

Reference Example 2

Using the polyester polyol produced in Reference Example 1, a particular polyurethane was produced by the following operation.

Polymerization was carried out in the same manner as in Example 1 except that 86 g of polyester polyol produced in Reference Example 1, 4.0 g of 1,4-butanediol, 265 g of DMF, 20 mg of a urethanization catalyst, 21 g of MDI, and 1.1 g MDI for divided addition were used, to obtain a polyurethane solution having a weight average molecular weight of 212,000. From the obtained polyurethane, aldehyde body and acetal groups were detected by $^1$H-NMR. Evaluation results on characteristics and physical properties of this polyurethane are shown in Table 2.

Comparative Example 3

Using the polyester polyol produced in Comparative Example 1, a particular polyurethane was produced by the following operation.

Polymerization was carried out in the same manner as in Example 1 except that 86 g of polyester polyol produced in Comparative Example 1, 3.6 g of 1,4-butanediol, 251 g of DMF, 21 mg of a urethanization catalyst, 20 g of MDI, and 1.0 g MDI for divided addition were used, to obtain a polyurethane solution having a weight average molecular weight of 140,000. From the obtained polyurethane, aldehyde body and acetal groups were detected by $^1$H-NMR. Evaluation results on characteristics and physical properties of this polyurethane are shown in Table 2.

Comparative Example 4

Using the polyester polyol produced in Comparative Example 2, a particular polyurethane was produced by the following operation.

Polymerization was carried out in the same manner as in Example 1 except that 80 g of polyester polyol produced in Comparative Example 2, 3.9 g of 1,4-butanediol, 246 g of DMF, 22 mg of a urethanization catalyst, 20 g of MDI, and 1.0 g MDI for divided addition were used, to obtain a polyurethane solution having a weight average molecular weight of 130,000. From the obtained polyurethane, aldehyde body and acetal groups were detected by $^1$H-NMR. Evaluation results on characteristics and physical properties of this polyurethane are shown in Table 2.

TABLE 2

| | | | Example 5 | Example 6 | Reference Example 2 | Comparative Example 3 | Comparative Example 4 |
|---|---|---|---|---|---|---|---|
| Material for production of polyurethane | Polyester polyol | g | 77 | 85 | 86 | 84 | 80 |
| | 1,4-Butanediol | g | 3.6 | 4.1 | 4.0 | 3.6 | 3.9 |
| | MDI | g | 20 | 22 | 22 | 21 | 21 |
| Physical properties of polyurethane | Molecular weight Mw (in terms of polystyrene) | | 131,000 | 200,000 | 212,000 | 140,000 | 130,000 |
| | Tensile test at room temperature | 100% M (MPa) | 7.2 | 7.7 | 8.0 | 10.9 | 7.8 |
| | | 300% M (MPa) | 12.8 | 14.0 | 14.6 | 11.3 | 13.3 |
| | | Elongation at break (%) | 711 | 670 | 554 | 447 | 448 |
| | | Breaking strength (MPa) | 51.1 | 51.9 | 43.6 | 11.2 | 21.9 |
| | Solvent resistance test (ratio of weight increase (%)) | Oleic acid | 31.3 | 21.5 | 35.6 | 45.8 | 32.9 |
| | | Ethanol | 5.6 | 4.9 | 6.7 | 9.1 | 7.2 |
| | | Ethyl acetate | 34.0 | 33.2 | 60.0 | 19.4 | 51.1 |

According to Table 1 and Table 2, it can be seen that polyester polyols having an aldehyde body content of 0.01 to 0.5% by weight have a favorable color tone, and allow urethanization without causing a problem, and that polyurethanes obtained therefrom have physical properties which provide flexibility, high elongation at break, high breaking strength, and, moreover, high resistance to various solvents.

While the invention has been described in detail and with reference to specific embodiments thereof, it will be apparent to one skilled in the art that various changes and modifications can be made therein without departing from the spirit and scope thereof.

The invention claimed is:

1. A polyester polyol comprising a structural unit derived from a dicarboxylic acid and a structural unit derived from an aliphatic diol, wherein
   a structural unit derived from 1,10-decanediol is contained as said aliphatic diol unit;
   said polyester polyol has a number average molecular weight of 250 to 5000; and
   said polyester polyol contains 0.01 to 0.5% by weight aldehyde body with respect to the total weight of the polyester polyol.

2. The polyester polyol according to claim 1, wherein said dicarboxylic acid contains a dicarboxylic acid derived from a biomass resource.

3. The polyester polyol according to claim 2, wherein said dicarboxylic acid contains succinic acid derived from a biomass resource.

4. A polyurethane resin obtained by reacting the polyester polyol according to claim 1 with one or more polyisocyanate compounds and a chain extender.

5. A method for producing a polyurethane resin, comprising a step of reacting the polyester polyol according to claim 1 with one or more polyisocyanate compounds.

6. A method for producing the polyester polyol according to claim 1, comprising a step of polycondensing at least a dicarboxylic acid and an aliphatic diol, wherein said aliphatic diol contains 1,10-decanediol; and the aldehyde body content in said polyester polyol is 0.01 to 0.5% by weight with respect to the total weight of the polyester polyol.

7. A synthetic leather or an artificial leather comprising the polyurethane resin according to claim 4.

8. An automotive part comprising the polyurethane resin according to claim 4.

9. A shoe sole comprising the polyurethane resin according to claim 4.

10. A footwear comprising the shoe sole according to claim 9.

11. A film comprising the polyurethane resin according to claim 4.

12. A sporting good comprising the polyurethane resin according to claim 4.

13. A paint comprising the polyurethane resin according to claim 4.

14. An adhesive comprising the polyurethane resin according to claim 4.

15. A foam comprising the polyurethane resin according to claim 4.

16. An elastomer comprising the polyurethane resin according to claim 4.

17. The elastomer according to claim 16, wherein the elastomer is thermoplastic elastomer.

18. A coating agent comprising the polyurethane resin according to claim 4.

* * * * *